US012666469B2

(12) United States Patent　　(10) Patent No.:　US 12,666,469 B2
De Foy et al.　　(45) Date of Patent:　Jun. 23, 2026

(54) MULTI-ACCESS PDU SESSION USING HEADER COMPRESSION

(71) Applicant: InterDigital Patent Holdings, Inc., Wilmington, DE (US)

(72) Inventors: Xavier De Foy, Kirkland (CA); Rocco Di Girolamo, Laval (CA); Guanzhou Wang, Brossard (CA); Michelle Perras, Montréal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 516 days.

(21) Appl. No.: 18/126,937

(22) Filed: Mar. 27, 2023

(65) Prior Publication Data

US 2023/0308947 A1　　Sep. 28, 2023

Related U.S. Application Data

(60) Provisional application No. 63/324,318, filed on Mar. 28, 2022.

(51) Int. Cl.
　H04W 76/10　　(2018.01)
　H04L 69/22　　(2022.01)
　　　　(Continued)

(52) U.S. Cl.
　CPC ............. H04W 76/10 (2018.02); H04L 69/22 (2013.01); H04W 28/065 (2013.01); H04L 69/04 (2013.01)

(58) Field of Classification Search
　CPC .... H04W 28/065; H04W 76/10; H04L 69/04; H04L 69/22
　See application file for complete search history.

(56) References Cited

U.S. PATENT DOCUMENTS

| | | | |
|---|---|---|---|
| 9,860,786 B1 * | 1/2018 | Wang ..................... | H04W 28/06 |
| 2011/0158166 A1 * | 6/2011 | Lee .......................... | H04L 69/04 |
| | | | 370/328 |

(Continued)

FOREIGN PATENT DOCUMENTS

WO　　WO-2017031700 A1 *　3/2017　............ H04W 28/06

OTHER PUBLICATIONS

Huang et al., "Method for Determining Compression Parameter of Data Packet for Relevant Device", Mar. 2, 2017, WO, WO 2017031700 (Year: 2017).*

(Continued)

*Primary Examiner* — Michael K Phillips

(74) *Attorney, Agent, or Firm* — Condo Roccia Koptiw LLP

(57)　　　　　ABSTRACT

Systems, methods, and instrumentalities are disclosed herein for establishing a connection between a network node and a wireless transmit/receive unit (WTRU). A network node (e.g., a user plane function (UPF)) may receive a connection request message from another network node (e.g., a session management function). The connection request may indicate a request to establish a connection between the network node (e.g., the UPF) and a WTRU. The connection request message may indicate a header compression configuration (HCC) supported by a proxy. The network node may receive a request message from the WTRU indicating an HCC supported by the WTRU. The network node may determine a supported HCC using the HCC supported by the proxy and the HCC supported by the WTRU. The network node may configure the proxy to use the supported HCC. The network node may establish a connection with the WTRU.

20 Claims, 14 Drawing Sheets

(51) Int. Cl.
  *H04W 28/06* (2009.01)
  *H04L 69/04* (2022.01)

(56) References Cited

U.S. PATENT DOCUMENTS

| | | | | |
|---|---|---|---|---|
| 2017/0339600 | A1 * | 11/2017 | Roeland ................. | H04L 47/76 |
| 2019/0116483 | A1 * | 4/2019 | Ryu ...................... | H04W 4/029 |
| 2019/0387401 | A1 * | 12/2019 | Liao ........................ | H04W 4/08 |
| 2020/0137628 | A1 * | 4/2020 | Kandasamy ........ | H04L 67/5651 |

OTHER PUBLICATIONS

3rd Generation Partnership Project (3GPP) TR 23.700-93 V17.0.0, "Technical Specification Group Services and System Aspects, Study on Access Traffic Steering, Switch and Splitting Support in the 5G System (5GS) Architecture, Phase 2 (Release 17)", Mar. 2021, pp. 1-101.

3rd Generation Partnership Project (3GPP) TS 36.323 V17.2.0, "Technical Specification Group Radio Access Network, Evolved Universal Terrestrial Radio Access (E-UTRA), Packet Data Convergence Protocol (PDCP) specification (Release 17)", Dec. 2022, pp. 1-57.

3rd Generation Partnership Project (3GPP) TS 36.331 V17.3.0, "Technical Specification Group Radio Access Network, Evolved Universal Terrestrial Radio Access (E-UTRA), Radio Resource Control (RRC), Protocol Specification (Release 17)", Dec. 2022, pp. 1-1133.

Iyengar et al., "RFC 9000 QUIC: A UDP-Based Multiplexed and Secure Transport", Internet Engineering Task Force (IETF), Standards Track, May 2021, pp. 1-151.

Kohler et al., "Datagram Congestion Control Protocol (DCCP)", Network Working Group, Request for Comments: 4340, Category: Standards Track, Mar. 2006, pp. 1-129.

Ozegovic et al., "DCCP Profile for EPIC", Network Working Group, Internet-Draft, Expires: Aug. 28, 2003, Feb. 28, 2002, pp. 1-20.

Pelletier et al., "Robust Header Compression Version 2 (ROHCv2): Profiles for RTP, UDP, IP, ESP and UDP-Lite", Network Working Group, Request for Comments: 5225, Category: Standards Track, Apr. 2008, pp. 1-124.

* cited by examiner

| Base Protocol | Inner packet | Header Compression not configuring IHC and/or OHC as described herein | Header Compression configuring IHC and/or OHC as described herein |
|---|---|---|---|
| QUIC | IP | 1) Inner IP and higher layer headers are not compressed<br>2) Outer IP/UDP headers are compressed by PDCP<br>3) QUIC header not compressed (not necessary if using a short or zero-length CID) | 1) IHC: compress IP and higher layer headers<br>  - either by DCCP/QUIC layer<br>  - or in PDCP layer<br>2) OHR |
| QUIC | Ethernet | 1) Inner Ethernet and higher layer headers not compressed<br>2) Outer IP/UDP headers are compressed by PDCP<br>3) QUIC header not compressed (not necessary if using a short or zero-length CID) | 1) IHC: compress Ethernet and higher layer headers<br>  - either by DCCP/QUIC layer<br>  - or in PDCP layer<br>2) OHR |
| QUIC | UDP Payload (e.g., using MASQUE to omit UDP/IP) | 1) No inner UDP/IP headers, e.g., only (uncompressed) RTP<br>2) Outer IP/UDP headers are compressed by PDCP<br>3) QUIC header not compressed (not necessary if using a short or zero-length CID) | 1) IHC, e.g., on RTP header:<br>  - either by DCCP/QUIC layer<br>  - or in PDCP layer<br>2) OHR |
| DCCP | IP | 1) Inner IP and higher layer headers are not compressed<br>2) Outer IP header is compressed by PDCP<br>3) DCCP header not compressed (can be remediated by adding a new DCCP/IP HC profile in PDCP) | 1) IHC: compress IP and higher layer headers<br>  - either by DCCP/QUIC layer<br>  - or in PDCP layer<br>2) OHR |
| DCCP | Ethernet | 1) Inner Ethernet and higher layer headers not compressed<br>2) Outer IP header is compressed by PDCP<br>3) DCCP header not compressed (can be remediated by adding a new DCCP/IP HC profile in PDCP) | 1) IHC: compress Ethernet and higher layer headers<br>  - either by DCCP/QUIC layer<br>  - or in PDCP layer<br>2) OHR |
| DCCP | UDP Payload (e.g., using MASQUE-like mechanism to omit UDP/IP) | (Assuming support is enabled in DCCP, e.g., as described herein using a MASQUE request over DCCP)<br>1) No inner UDP/IP headers are transported, e.g., only (uncompressed) RTP<br>2) Outer IP header is compressed by PDCP | 1) IHC, e.g., on RTP header:<br>  - either by DCCP/QUIC layer<br>  - or in PDCP layer, e.g., using a new RTP/DCCP/IP PDCP HC profile<br>2) OHR |

FIG. 4

```
PDCP-Config-NB ::=       SEQUENCE {
(other existing fields are unchanged)
headerCompression       CHOICE {
    notUsed             NULL,
    rohc                SEQUENCE {
        maxCID-r13          INTEGER (1..16383)                  DEFAULT 15,
        profiles-r13        SEQUENCE {
            profile0x0002       BOOLEAN,
            profile0x0003       BOOLEAN,
            profile0x0004       BOOLEAN,
            profile0x0006       BOOLEAN,
            profile0x0102       BOOLEAN,
            profile0x0103       BOOLEAN,
            profile0x0104       BOOLEAN,
            (additional profiles may be added, e.g., for QUIC/UDP/IP or DCCP/IP, etc.)
        },
        ...
    }
    secondaryHeaderCompression  CHOICE {
    rohc                SEQUENCE {
        maxCID              INTEGER (1..16383)                  DEFAULT 15,
        profiles            SEQUENCE {
            profile0x0002       BOOLEAN,
            profile0x0003       BOOLEAN,
            profile0x0004       BOOLEAN,
            profile0x0006       BOOLEAN,
            profile0x0102       BOOLEAN,
            profile0x0103       BOOLEAN,
            profile0x0104       BOOLEAN,
            (additional profiles may be added, e.g., for RTP/QUIC or RTP/UDP/IP/DCCP, etc.)
        } OPTIONAL,
        ...
    },
    ...
}
```

FIG. 7

MULTI-ACCESS PDU SESSION USING HEADER COMPRESSION

CROSS-REFERENCE TO RELATED APPLICATIONS

This application claims the benefit of U.S. Provisional Application Ser. No. 63/324,318 filed Mar. 28, 2022, the contents of which are incorporated by reference herein.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are disclosed herein for compressing one or more headers. A network node may receive a connection request message. For example, a first network node may receive a connection request message from a second network node. The first network node described herein may be associated with and/or may provide a user plane function (UPF). The second network node described herein may be associated with and/or may provide a session management function (SMF).

In examples, the connection request message may indicate a request to establish a connection between the first network node and a wireless transmit/receive unit (WTRU). The connection request message may indicate and/or may be configured to indicate a header compression configuration (HCC), such as a first HCC. For example, the HCC (e.g., the first HCC) may indicate one or more compression methods supported by a proxy. The network node (e.g., the UPF) may configure a proxy using the HCC (e.g., the first HCC). In examples, the HCC (e.g., the first HCC) may indicate a compression method and one or more compression profiles supported by the proxy.

In examples, the connection request message may indicate a tunneling protocol. For example, the network node (e.g., the UPF) may establish a connection (e.g., a connection between the WTRU and a network node/SMF) using the tunneling protocol. The network node (e.g., the UPF) may send a message to another network node (e.g., the SMF). For example, the first network node (e.g., the UPF) may send a connection response message to the second network node (e.g., the SMF). The connection response message may indicate an address for a proxy.

The network node (e.g., the UPF) may receive a request message from the WTRU. For example, the network node (e.g., the UPF) may receive a request message from the WTRU via the proxy. The request message may indicate and/or may be configured to indicate an HCC, such as a second HCC. In examples, the second HCC may indicate one or more compression methods supported by the WTRU. In examples, the second HCC may indicate a compression method and one or more compression profiles supported by the WTRU. The second HCC may differ from the first HCC. The request message may indicate the address associated with the proxy.

The network node (e.g., the UPF) may determine a supported HCC using the HCC supported by the proxy (e.g., the first HCC) and the HCC supported by the WTRU (e.g., the second HCC). The supported HCC may indicate a compression method supported by the proxy and the WTRU. In examples, the network node (e.g., the UPF) may determine a supported compression method using the one or more compression methods supported by the proxy and the one or more compression methods supported by the WTRU. The network node (e.g., the UPF) may determine the supported HCC based on the supported compression method In examples, the network node (e.g., the UPF) may determine a supported compression profile using the one or more compression profiles supported by the proxy (e.g., the first HCC) and the one or more compression profiles supported by the WTRU (e.g., the second HCC). The network node (e.g., the UPF) may determine the supported HCC based on the supported compression profile and the compression method.

The network node (e.g., the UPF) may configure the proxy to use the supported HCC. The network node (e.g., the UPF) may send a response message to the WTRU. The response message may indicate the supported HCC (e.g., the supported HCC between the proxy and the WTRU). The network node (e.g., the UPF) may establish a connection between the network node and the WTRU.

In examples, the network node (e.g., the UPF) may receive a data message (e.g., a first data message). The data message may be or may include a compressed header and a data payload. The network node (e.g., the UPF) may determine a header by decompressing the compressed header using the supported HCC. The network node (e.g., the UPF) may determine a network node (e.g., a third network node) using the header. The network node (e.g., the UPF) may send a data message (e.g., a second data message) to the network node (e.g., the third network node). The data message (e.g., the second data message) may be or may include the header and the data payload.

In examples, the network node (e.g., the UPF) may receive a data message (e.g., a first data message). For example, the network node (e.g., the UPF) may receive a data message from a network node (e.g., a third network node). The data message (e.g., the first data message) may be or may include a header and a data payload. The network node (e.g., the UPF) may determine a compressed header by compressing the header using the supported HCC. The network node (e.g., the UPF) may send a data message (e.g., a second data message) to the WTRU. The data message (e.g., the second data message) may be or may include the compressed header and the data payload.

Systems, methods, and instrumentalities are disclosed herein for compressing one or more headers in a multi-access protocol data unit (MA-PDU) session. For example, if an MA-PDU session is based on a quick user datagram protocol (UDP) Internet connections (QUIC) protocol, or a datagram congestion control protocol (DCCP), one or more headers in an MA-PDU session may be compressed. In examples, the DCCP/QUIC layer may apply inner header compression (IHC). In examples, a packet data convergence protocol (PDCP) layer may apply inner header compression. In examples, an outer header may remove point-to-point connections between a WTRU and a proxy device.

Systems, methods, and instrumentalities are disclosed herein for a WTRU initiating and/or modifying an MA-PDU session. The MA-PDU session may carry IP, Ethernet, UDP payload, and/or the like. Based on a request from the WTRU, a network node and/or an SMF associated with a network node may obtain an HCC, e.g., from one or more policy and chancing control (PCC) rules. For example, the network node/the SMF may configure a compression, e.g., an HCC, on a network node/a UPF associated with a network node. The network node/the SMF may provide a compression configuration (e.g., an HCC) to the WTRU. For example, the network node/the SMF may provide an HCC in a response message to the WTRU. In examples, the network node/the SMF may provide an HCC to the WTRU over NAS signaling (e.g., in a PDU session establishment/ modification accept message). In examples, the network node/the SMF may provide an HCC to the WTRU over DCCP/QUIC signaling (e.g., in connection configuration message response or in a MASQUE response message). The WTRU and the network node/the UPF may configure IHC. In examples, compression/decompression may be performed by a DCCP/QUIC connection (e.g., for one or more flows identified by a MASQUE request). In examples, compression/decompression may be performed by a tunnel client (e.g., on the WTRU) and/or a server (e.g., on the network node/the UPF). Inner traffic headers of related flows may be compressed between the WTRU and the network node/the UPF.

BRIEF DESCRIPTION OF THE DRAWINGS

FIG. 4 illustrates examples of the applicability of an inner header compression (IHC) and/or outer header removal (OHR).

FIG. 7 illustrates an exemplary packet data convergence protocol (PDCP) configuration for the double application of robust header compression protocol (ROHC).

EXAMPLE NETWORKS FOR IMPLEMENTATION OF THE EMBODIMENTS

Figure 1A:
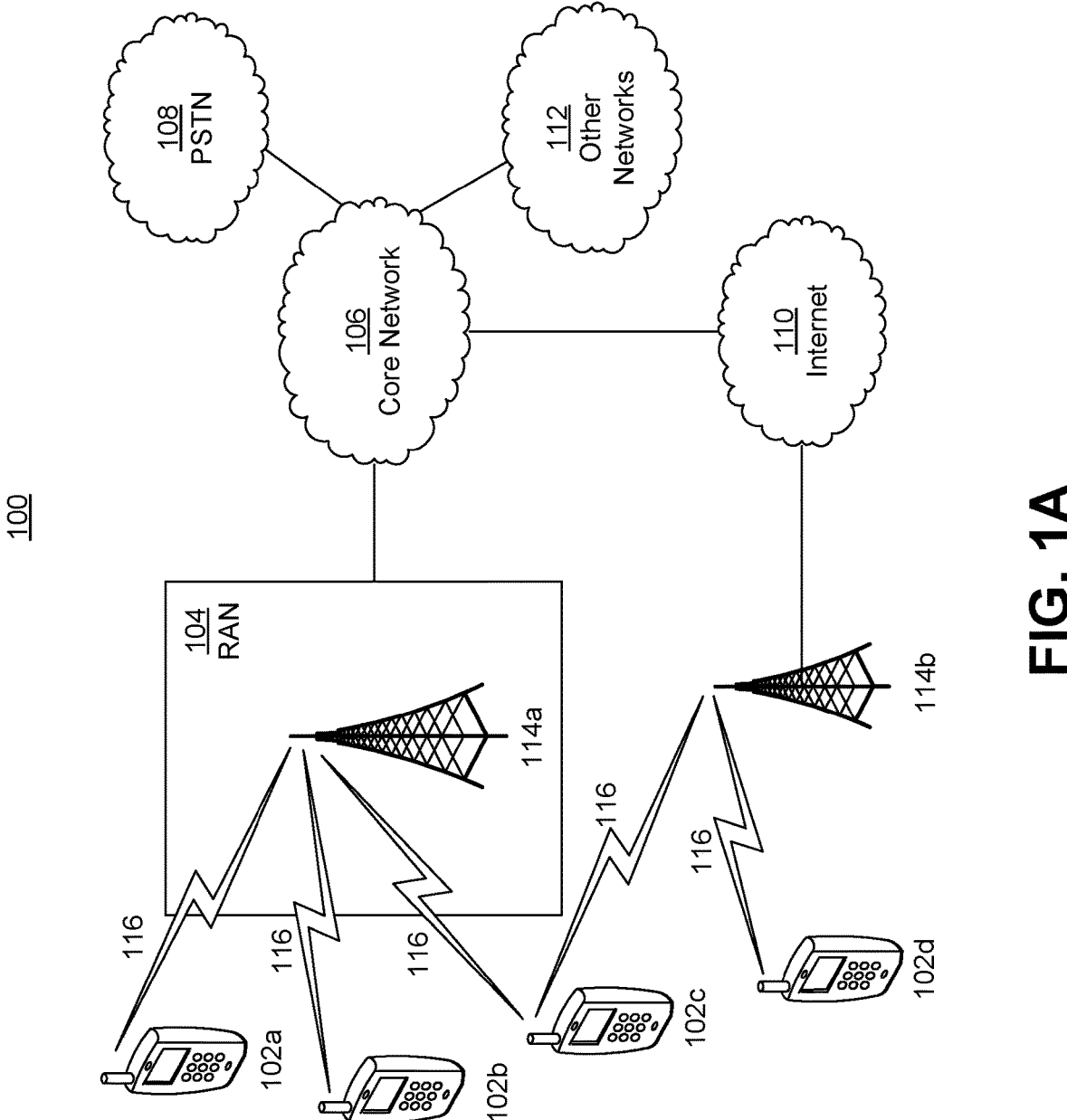
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
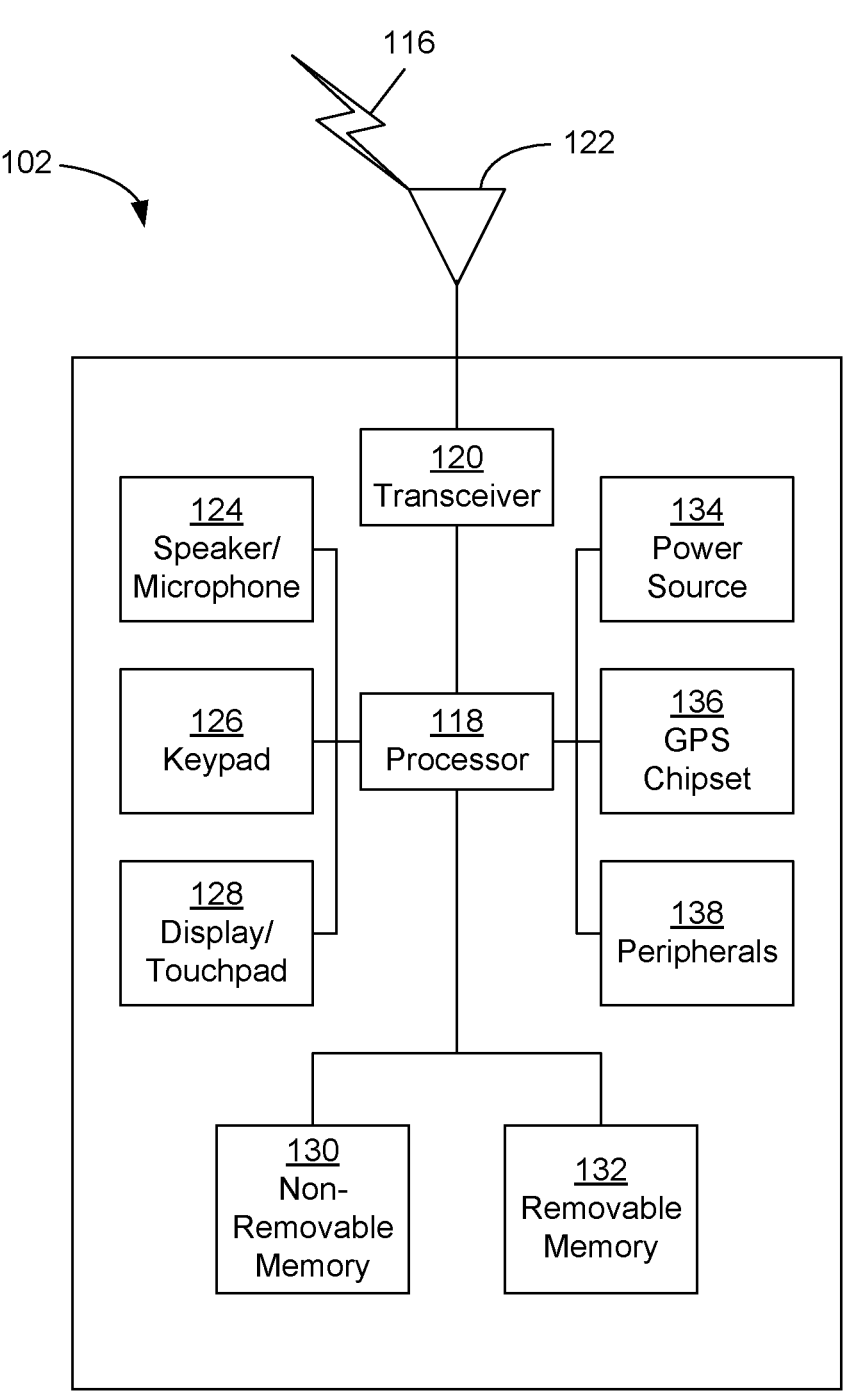
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
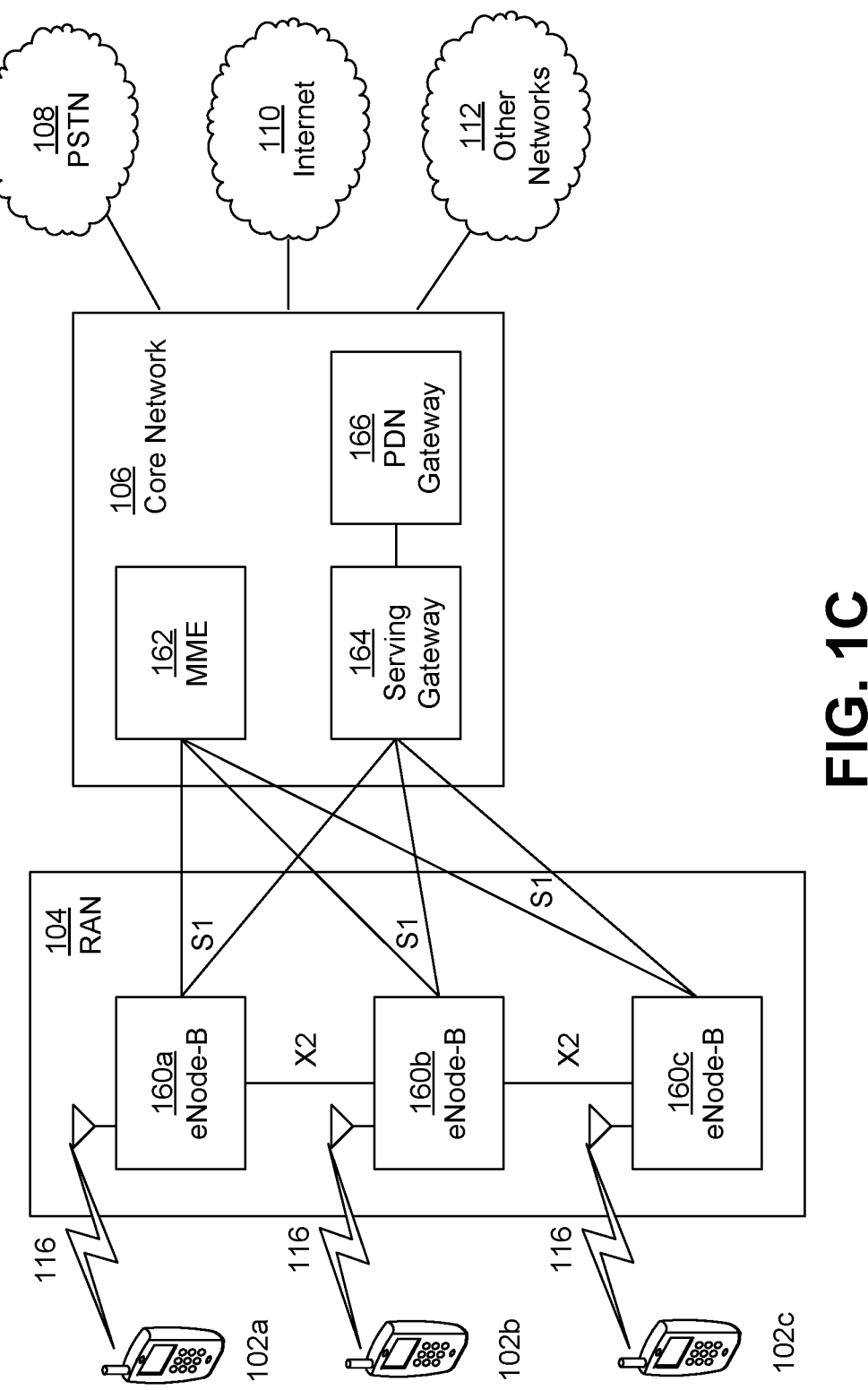
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
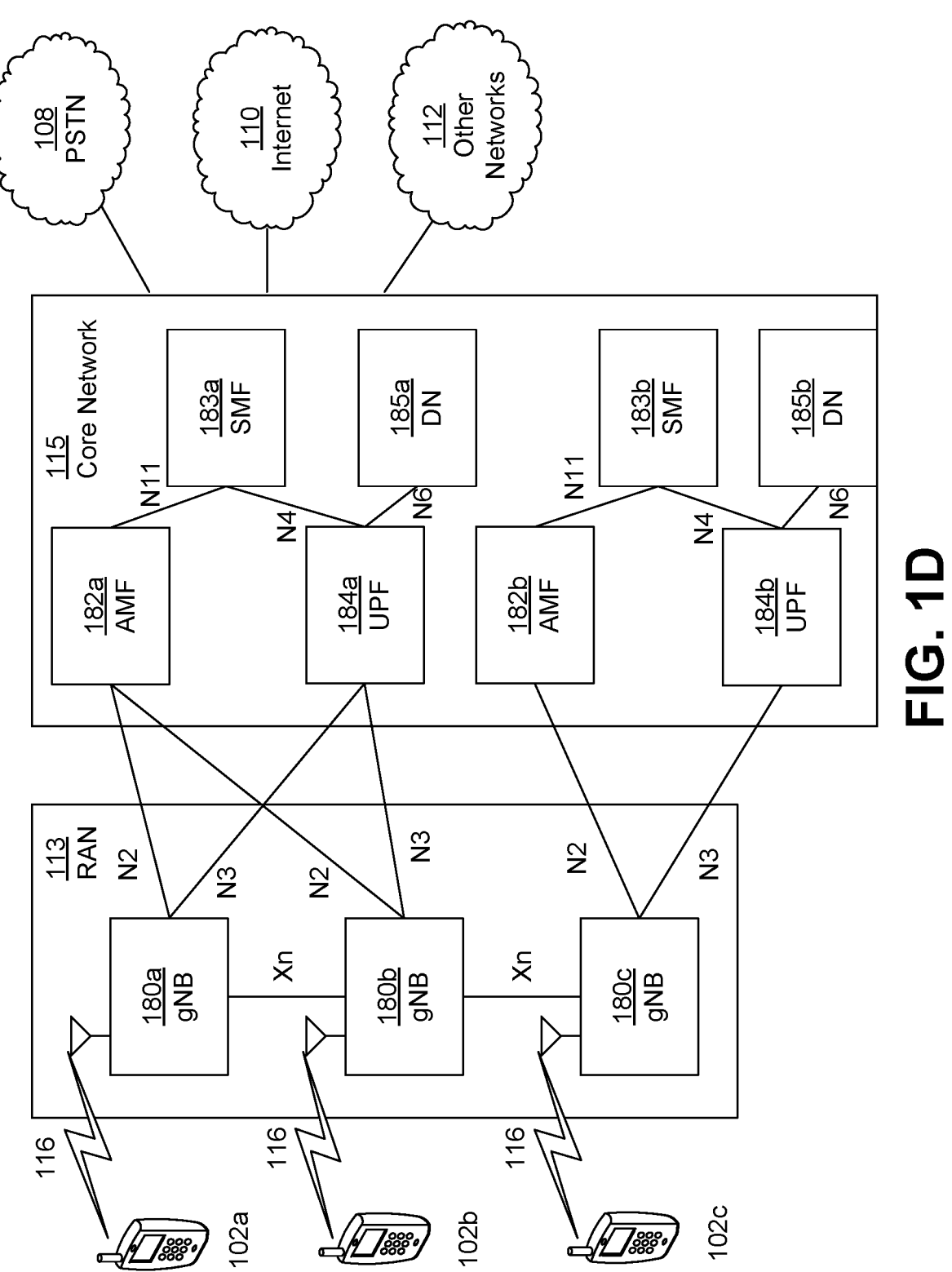
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allo-cating UE IP address, managing PDU sessions, controlling policy enforcement and QoS, providing downlink data noti-fications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Inter-net 110, to facilitate communications between the WTRUs 102a, 102b, 102c and IP-enabled devices. The UPF 184a, 184b may perform other functions, such as routing and forwarding packets, enforcing user plane policies, support-ing multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding descrip-tion of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communi-cation network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being imple-mented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WTRU may be configured to and/or be capable of using 3GPP access and/or non-3GPP access. A network operator may use the flexibility (e.g., capable of using 3GPP access and/or non-3GPP access network) and may determine which access to use for a service data flow. A network operator may use access traffic steering, switch, and splitting (ATSSS). For example, ATSSS may set up a multi-access (MA) PDU session. Traffic from a service data flow may be sent over 3GPP access and/or over non-3GPP access. ATSSS may use steering functionality logic and may switch, steer, and/or split the data flow. ATSSS may use multipath transmission control protocol (MPTCP) and/or ATSSS-lower layer (LL). In examples, ATSSS may use MPTCP for TCP traffic and/or the like. In examples, ATSSS may use ATSSS-LL for Ethernet, TCP, UDP traffic, and/or the like.

In examples, steering functionality may be used for car-rying UDP, Ethernet, and/or other types of traffic over MA-PDU sessions. For example, the exemplary steering functionality may be based on a quick UDP Internet con-nections (QUIC) protocol and/or based on a datagram con-gestion control protocol (DCCP). A steering functionality based on a QUIC protocol may be or may include a multipath extension. A steering functionality based on a DCCP protocol may be or may include a multipath exten-sion.

3GPP system may use compression. At a layer, such as a PDCP layer, a WTRU may implement compression. For example, a WTRU may implement a compression algo-rithm, such as uplink data compression (UDC), robust header compression protocol (ROHC), Ethernet header compression (EHC), and/or the like. To transport QUIC over UDP over IP, a system, such as a 5G system, may use a ROHC compression with profile UDP/IP, following robust header compression (RFC) 3095/4815 or RFC 5225. ROHC may reduce IP (e.g., typically 20-byte IPv4 or 60-byte IPv6) headers down to 1 to 3 octets in one or more packets. The UDC protocol may be based on IETF RFC 1951 (e.g., DEFLATE compressed data format specification). EHC protocol may be based on the Ethernet header compression (EHC) framework. In examples, EHC and ROHC may be used (e.g., may be used simultaneously).

A number of profiles may be provided for ROHC. For example, one or more profiles may compress and/or may be configured to compress IP headers, UDP/IP headers, and/or real-time transport protocol (RTP)/UDP/IP headers. In a ROHC implementation, a packet(s) may be classified into a stream. For example, a packet may be classified into a stream for a ROHC implementation before being com-pressed. The classification of the packet into a stream for a ROHC implementation, e.g., before being compressed, may be used for inter-packet redundancy. The ROHC protocol may skip standardizing one or more stream classification algorithms, e.g., that may be provided by an implementor(s).

Multiplexed application substrate over QUIC encryption (MASQUE) protocol may enable configuring and/or run-ning one or more (e.g., multiple) proxied flows in an HTTP connection. For example, MASQUE Protocol may use HTTP/3 over QUIC. The MASQUE services may include UDP CONNECT and/or IP proxying. To initiate a service, such as a UDP CONNECT service, a client may send an HTTP CONNECT request to a proxy, e.g., using a URL such as https://masque.example.org/{target_host}/{target_port}/. Masque.example.org may be a fully qualified domain name (FQDN) resolving into a MASQUE proxy. {target_host} may be a remote server FQDN or an IP address. {target-_port} may be a target UDP port on a remote server. The HTTP CONNECT request may be or may include a connect-udp service label. For example, the HTTP CONNECT may include a connect-udp service label as a protocol pseudo-header value or as an upgrade header value. A MASQUE proxy may start forwarding UDP traffic between a client and a remote server. For example, upon accepting such a request (e.g., an HTTP CONNECT request), a MASQUE proxy may start forwarding UDP traffic between a client and a remote server. Between a client and a MASQUE proxy, data traffic may be composed of packets, e.g., including an end-to-end UDP payload. The data traffic may be sent over a flow associated with the stream, e.g., used by the CONNECT request. Between the MASQUE proxy and the remote server, data traffic may be transmitted over UDP/IP. IP Proxying may be a MASQUE service initiated with a CONNECT request, e.g., including a connect-ip service label. One or more MASQUE services may be derived from other services (e.g., one or more existing services), e.g., to enable Ethernet proxying.

Figure 2:
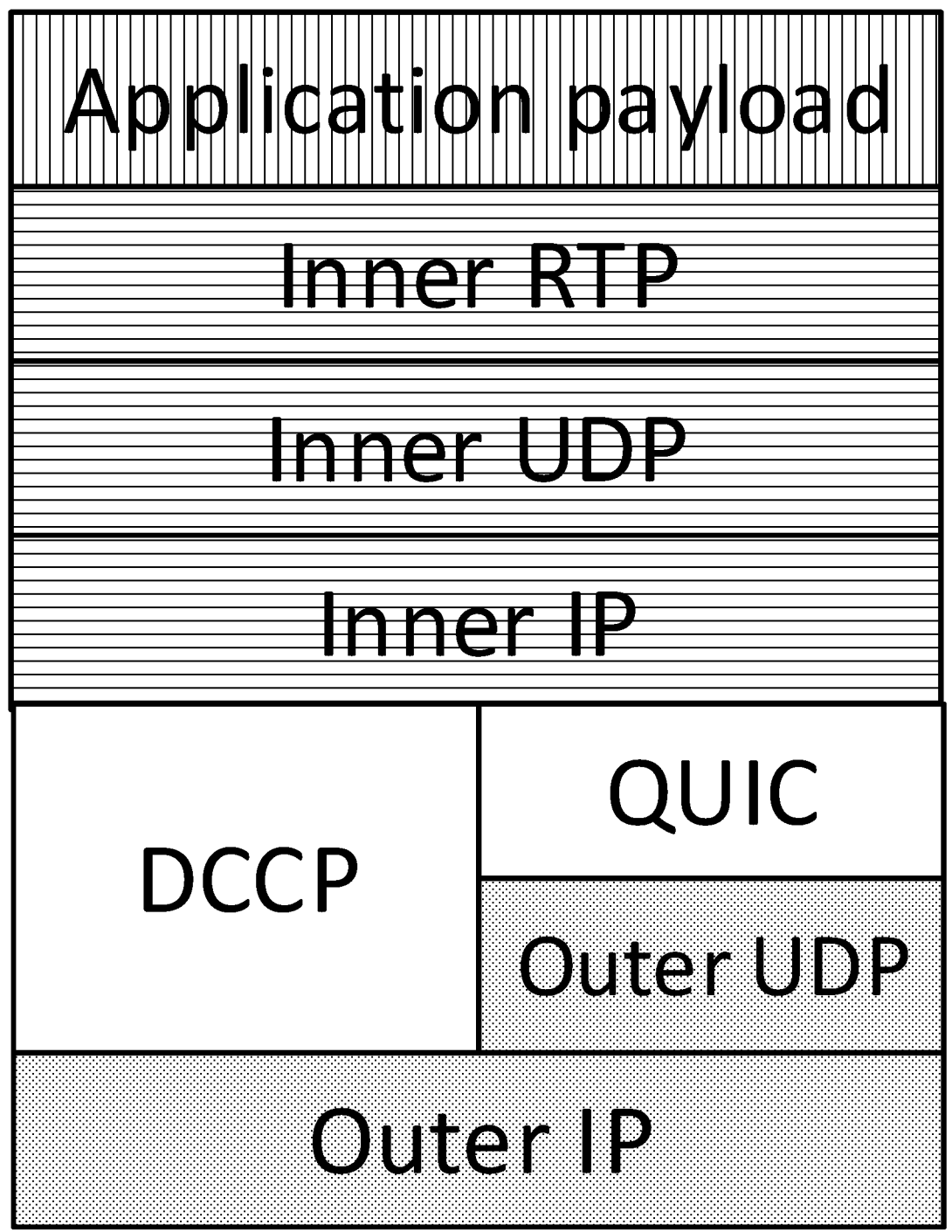
FIG. 2 illustrates an example inner and outer headers in datagram congestion control protocol (DCCP)/quick user datagram protocol (UDP) Internet connections (QUIC)-based access traffic steering, switch, and splitting (ATSS).

QUIC- and DCCP-based steering functionalities in ATSSS (e.g., 5G ATSSS) may enable DCCP/QUIC to carry traffic over one or more MA-PDU sessions. The traffic over one or more MA-PDU sessions described herein may be or may include RTP, UDP, and/or IP traffic. FIG. 2 illustrates an example inner and outer headers in DCCP/QUIC-based ATTS. FIG. 2 may represent an exemplary packet transported over a DCCP/QUIC-based MA-PDU session. The DCCP and/or QUIC protocol may be used to encapsulate data packet(s) sent over an MA-PDU session. Corresponding headers of the data packets may be identified as inner headers. Corresponding headers encapsulating QUIC or DCCP headers may be identified as outer headers. The QUIC protocol may use framing. For example, the QUIC header illustrated in FIG. 2 may be or may include a QUIC protocol header and/or a frame header (e.g., a datagram frame header). The QUIC packet structure, e.g., illustrated in FIG. 2, may represent the inner headers (e.g., DATAGRAM) and/or a frame included in a QUIC packet. In examples, the QUIC packet structure may skip having a frame (e.g., additional frame as illustrated in FIG. 2). A QUIC packet structure described herein may include one or more frame headers. Alternatively and/or additionally, a QUIC packet structure described herein may omit one or more frame headers. The QUIC packet structure may represent a frame (e.g., one frame) in a QUIC packet.

In a system (e.g., a 5G system), an air interface for DCCP/QUIC-based MA-PDU sessions may not be used (e.g., may not be used efficiently) for one or more of the following: inner traffic headers transported over DCCP/QUIC may not be compressed; and/or outer headers may impose an overhead of 1-3 bytes over the air.

Inner traffic headers transported over DCCP/QUIC may not be compressed. For example, IP traffic (e.g., and/or Ethernet traffic) over DCCP/QUIC may not be handled by one or more compression mechanisms at a PDCP layer. UDP/IP headers may be optimized. For example, UDP/IP headers may be optimized by using MASQUE with QUIC. The remaining payload may not be compressed. For example, the remaining payload may not be compressed using an RTP header compression.

Outer headers (e.g., UDP/IP if using QUIC and IP if using DCCP) may be compressed. For example, outer headers (e.g., UDP/IP if using QUIC and IP if using DCCP) may be compressed at a PDCP layer. The compressed outer header may impose an overhead of 1-3 bytes over the air. The compressed outer header may account for the processing cost of compressing by the PDCP layer.

QUIC may be used to designate QUIC or multipath (MP)-QUIC (e.g., QUIC including its multipath extension). DCCP may be used to designate DCCP or MP-DCCP. DCCP/QUIC may be used if a text applies to DCCP or QUIC protocol.

Figure 3A:
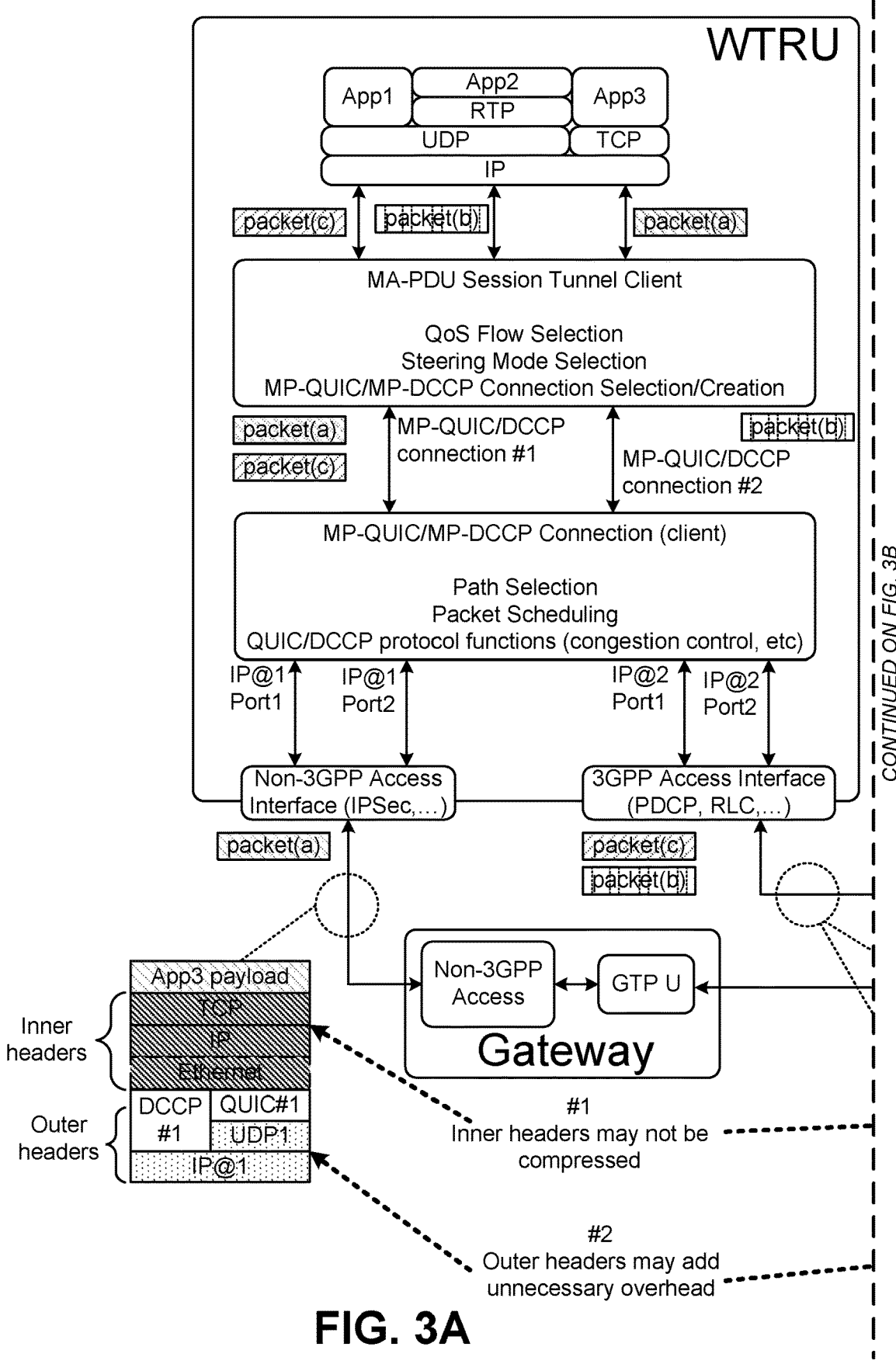
FIGS. 3A-3C illustrate an exemplary architecture of a DCCP/QUIC-based multi-access protocol data unit (MA-PDU) session.
Figure 3B:
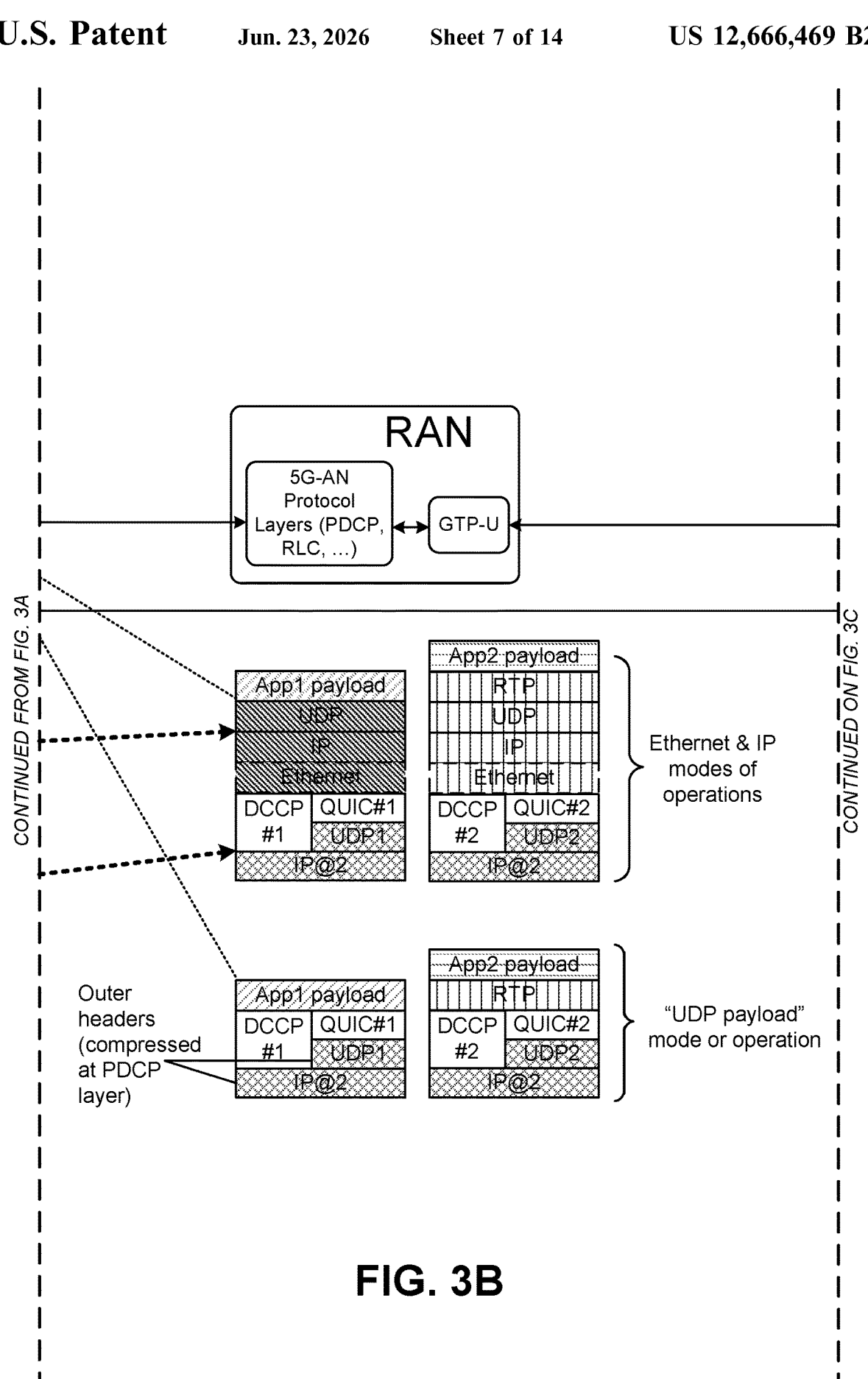
Figure 3C:
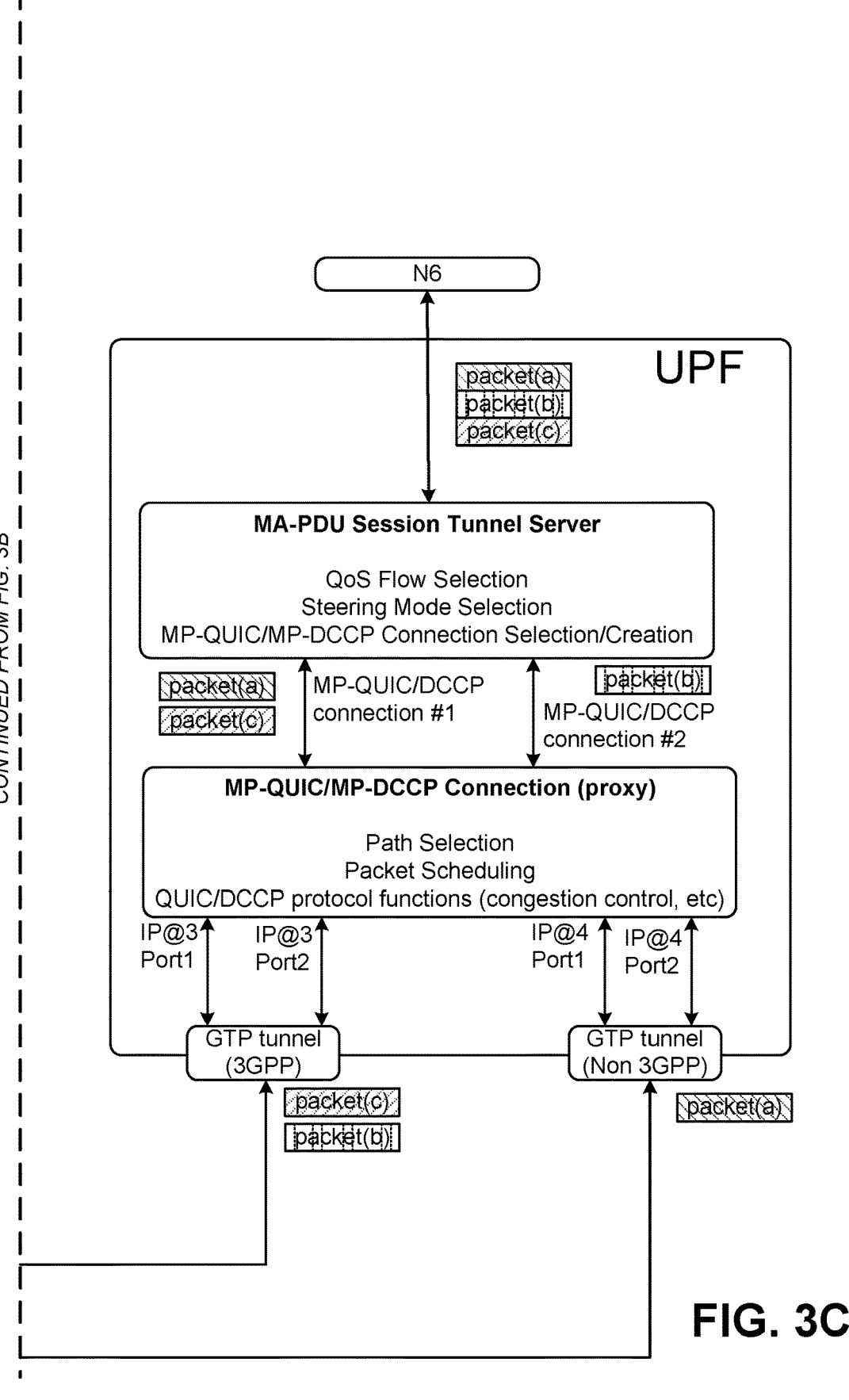

FIGS. 3A-3C illustrate an example architecture of a DCCP/QUIC-based MA-PDU session. As illustrated in FIGS. 3A-3C, App1, App2, and App3 may be three exemplary client applications on and/or associated with a WTRU. The client applications on and/or associated with the WTRU may communicate with an access stratum (AS). For example, the client applications on and/or associated with the WTRU may communicate with an AS using AS signaling in a data network beyond the N6 interface, respectively, over UDP/IP, RTP/UDP/IP, and TCP/IP. Packets sent/received by the one or more applications may be respectively represented as packet (c), packet (b), and packet (a), as shown in FIGS. 3A-3C.

As shown in FIGS. 3A-3C, MA-PDU session tunnel client on the WTRU may process one or more packets (e.g., packet (a), packet (b), and/or packet (c)) sent by the one or more applications. The MA-PDU session tunnel client may perform QoS flow selection, steering mode selection, and/or may select/create an MP-DCCP/MP-QUIC connection to handle the packets. An MP-DCCP/MP-QUIC connection and a DCCP/QUIC connection may be used interchangeably. One or more DCCP/QUIC connections may be used to handle an MA-PDU. For example, one DCCP/QUIC connection may be used per QoS Flow. MA-PDU session tunnel client on the WTRU may process the one or more packets received from a network and may forward the one or more packets towards the respective application clients. MA-PDU session tunnel server on the UPF may perform one or more functions described herein (e.g., respectively on downlink and uplink packets). The MA-PDU session tunnel server may forward the one or more packets to/from an application endpoint (e.g., beyond the N6 interface).

As shown in FIGS. 3A-3C, multipath (MP)-DCCP/MP-QUIC connection (e.g., an MP-DCCP/MP-QUIC connection and a DCCP/QUIC connection may be used interchangeably) on a WTRU may be a client DCCP/QUIC instance that performs path selection, packet scheduling, and/or other DCCP/QUIC protocol functions, such as congestion control. An MP-DCCP/MP-QUIC connection on a network node/a UPF may be a server DCCP/QUIC instance that performs the same functions. The server instance may be called a proxy. The server instance may have a role of a proxy between an application client and an application server. In examples, functions provided by a network node and/or a UPF associated with a network node and a proxy may be designated as proxy/UPF. In examples, if functions of the DCCP/QUIC connections are configured, the proxy may be used. In examples, if functions, such as other UPF functions, e.g., including the MA-PDU session tunnel server, are configured, the network node/the UPF may be used.

FIGS. 3A-3C may represent exemplary packet structures. Application packets may be encapsulated in DCCP/QUIC packet by a DCCP/QUIC connection (e.g., in WTRU or UPF). The application packets may be sent over a RAN and/or a core network towards the remote DCCP/QUIC connection (e.g., in UPF or WTRU). In examples, the inner packet may be an IP packet, e.g., if the MA-PDU session type is IP. In examples, the inner packet may be an Ethernet frame, e.g., if the MA-PDU session type is Ethernet. UDP payload mode of operation may be represented as illustrated in FIGS. 3A-3C. MASQUE may be used to omit the inner UDP/IP headers between the DCCP/QUIC client and proxy, e.g., for the UDP payload mode of operation. UDP payload mode of operation (e.g., may be used interchangeably as MASQUE mode of operation) may be used on IP-type MA-PDU session as an optimization for UDP flows. The QUIC connection may identify a UDP flow, may determine to use MASQUE, e.g., to optimize network resource usage, and/or may initiate a MASQUE request for the flow and handle the flow (e.g., by removing/adding UDP/IP headers on received/sent datagrams).

As described herein, one or more inner headers may not be compressed between a WTRU and a UPF (e.g., MASQUE may enable removing UDP/IP headers). As discussed herein, one or more outer headers may be compressed between a WTRU and a RAN (e.g., a 3GPP RAN) and may not be compressed in other segment(s) of the path. Two paths described herein may be represented between a WTRU and a UPF, e.g., one path through a 3GPP access and one path through a non-3GPP access. Two or more paths may be supported by DCCP/QUIC-based MA-PDU sessions.

Overhead in an MA-PDU session(s), e.g., per-packet overhead in an MA-PDU session(s), may be reduce based on one or more of the following: using an inner header compression (IHC) mechanism(s) and/or an outer header removal (OHR) in point-to-point DCCP/QUIC/MPTCP MA-PDU session(s).

One or more IHC mechanisms may be used to reduce overheads in one or more MA-PDU sessions. An access-independent, e.g., 3GPP and non-3GPP, inner header compression for DCCP/QUIC MA-PDU sessions may be supported. The access-independent inner head compression described herein may be named as a DCCP/QUIC layer IHC. The DCCP/QUIC layer IHC may compress one or more headers, e.g., IPv4, IPv6, UDP, and RTP headers, for data packets that are carried inside one or more respective MA-PDU sessions DCCP/QUIC connections. The DCCP/QUIC layer IHC may establish a context between a WTRU and a network (e.g., SMF/UPF). The DCCP/QUIC layer IHC may establish a context, e.g., using one or more data path messages (e.g., initial packet or MASQUE request in DCCP/QUIC) or a NAS signaling (e.g., using IEs in PDU session establishment messages).

DCCP/QUIC layer IHC may reduce the size of packets carried between a WTRU and a UPF/proxy. In an example of an IP packet carrying an RTP payload, an exemplary reduction of a typically 40-byte or 60-byte RTP/UDP/IP header (e.g., over IPv4 or IPv6, respectively) down to, e.g., 4 bytes as a typical compressed size if using a ROHC compression. DCCP/QUIC layer IHC may compress an MA-PDU session traffic over a 3GPP RAN (e.g., as a PDCP layer compression does) and/or in a core network (e.g., between a RAN node and a UPF). The reduction in the size of packets described herein may be used to resolve a backhaul in a wireless setting. The reduction in size of packets described herein may alleviate congestion on a non-3GPP access.

DCCP/QUIC layer IHC may be useful with IP and Ethernet traffic. the DCCP/QUIC layer IHC may provide gains, e.g., by compressing inner RTP headers, if used along with other optimizations such as MASQUE (e.g., enabling inner UDP/IP headers omissions between WTRU and proxy).

An access-dependent, PDCP-based, inner header compression for DCCP/QUIC MA-PDU sessions may be supported. PDCP compression may apply over a 3GPP access and may be extended, as described herein, e.g., to support one or more DCCP/QUIC based MA-PDU sessions. A header compression function, e.g., an enhanced header compression function, may be configured in a PDCP layer. The header compression function may correspond to supporting one or more ROHC profiles (e.g., one or more new ROHC profiles). The one or more ROHC profiles may include one or more inner headers and/or outer headers (e.g., including a profile for headers RTP/UDP/IP/DCCP/IP). The one or more inner headers and/or the outer headers may be applied. ROHC profiles may be on outer headers (e.g., a first time) and be applied to inner headers (e.g., a second time) to DCCP/IP and RTP/UDP/IP. The ROHC profiles being applied twice, as described herein, may add a process (e.g., an additional process) in the PDCP layer. The ROHC profiles being applied twice as described herein may reuse ROHC stream classification algorithms (e.g., that are currently implemented). PDCP-based IHC may reduce the size of packets carried between a WTRU and a RAN.

OHR in point-to-point DCCP/QUIC/MPTCP MA-PDU sessions described herein may reduce per-packet overhead in MA-PDU sessions. As described herein, one or more MA-PDU sessions may have a point-to-point mode. QoS flows of the MA-PDU session may be dedicated to transporting point-to-point traffic, e.g., traffic of a DCCP/QUIC/MPTCP connection between WTRU and proxy/UPF. In a point-to-point MA-PDU session, a QoS Flow may be associated with one or more point-to-point connection information traffic filters (e.g., 5-tuple WTRU IP address and port, proxy IP address and port, protocol, and/or the like). Outer headers (e.g., UDP/IP or IP headers) may be omitted on a QoS flow.

QoS flows not associated with point-to-point information may be used. For example, the QoS flow may be used for traffic, e.g., including router advertisements between a UPF and a WTRU, etc.

A gain from OHR may be to save 1 to 3 bytes per packet (e.g., the typical size of UDP/IP headers compressed using ROHC) between a WTRU and a 3GPP-RAN and/or saving associated compression processing on a WTRU and a RAN. OHR may save uncompressed outer headers (e.g., UDP/IP or IP, which may range between 20 and 48 bytes depending on the IP version and presence of UDP header and not counting options) between a RAN and a UPF and over a non-3GPP access.

The compressions described herein for MA-PDU sessions may be applied to single access PDU sessions. For example, the single access PDU sessions using tunneling protocols, e.g., such as DCCP or QUIC, may be used to carry traffic between a WTRU and a proxy.

FIG. 4 illustrates examples of the applicability of IHC and/or OHC as described herein. As shown in FIG. 4, header compressions not configuring IHC and/or OHC as described herein and header compressions configuring IHC and/or OHC as described herein may show applicability for one or more protocols and/or inner packets.

An access-independent IHC for DCCP/QUIC MA-PDU sessions may be configured. MA-PDU-wide, per-DCCP/

QUIC-connection, and/or per-DCCP/QUIC flow header compression configuration may be used. The DCCP/QUIC layer may implement the access independent IHC functionality described herein, e.g., by a software program handling the DCCP/QUIC connection on each side of a DCCP/QUIC connection. In the context of an MA-PDU session, the access independent IHC functionality may be implemented between the DCCP/QUIC layer in a WTRU and a DCCP/QUIC proxy in UPF. The access independent IHC functionality may be enable IHC between a DCCP/QUIC client and a proxy, between a client and a server, between a proxy and a proxy, and/or between a proxy and a server.

A header compression configuration (HCC) IE may be provided. The HCC IE may include a compression sub-IE (e.g., ROHC, EHC, ROHC, and EHC, etc.) and one or more related parameter sub-IEs, such as supported ROHC profiles (e.g., UDP/IP, RTP/UDP/IP, etc.). ROHC and EHC may be used as exemplary compressions herein, and other compressions and/or related profiles may be supported. Sub-IEs, such as a QoS flow ID or Service Data Flow filters, may be used to associate HCC information with a flow. For example, sub-IEs may be used as a sub-IE of HCC or as a separate IE associated with HCC IE, e.g., depending on the context as described herein. HCC IE may be or may include a list of Unit HCC IE, e.g., to configure compression for one or more flows.

Exemplary HCC IE may be provided herein:
HCC IE
   '--(1 or more) Unit HCC IE
     |--Compression method sub-IE (e.g., ROHC, EHC, ROHC, EHC, and/or the like)
     |--Supported compression profiles sub-IE (e.g., ROHC profiles)
     '--[QoS Flow ID sub-IE]

MA-PDU-wide IHC may be configured. An HCC IE may be provided (e.g., defined) in a PDU session establishment/modification request and/or accept message(s). The WTRU and/or the SMF/UPF may set the HCC IE. The HCC IE may be associated with an MA-PDU session or associated with a QFI, e.g., by adding a QFI sub-IE to the HCC IE. Upon reception, the HCC IE may be used by a WTRU and/or an SMF/UPF. In examples, the WTRU and/or the SMF/UPF may use the received HCC IE to configure a DCCP/QUIC connection(s) on the WTRU and/or the UPF. In examples, the WTRU and/or the SMF/UPF may use the received HCC IE to associate with an MA-PDU session and/or associate with the QFI (e.g., if provided), e.g., using a programmatic configuration application programming interface (API).

Per-DCCP/QUIC connection IHC may be configured. One or more IEs and/or messages may be used, e.g., using one or more of the following: QUIC connection-wide configuration of IHC, per-service flow configuration of QUIC IHC, DCCP connection-wide configuration of inner header compression, and/or per-service flow configuration of DCCP inner header compression.

Per-DCCP/QUIC connection IHC may be configured using QUIC connection-wide configuration of IHC. An HCC IE may be added as a QUIC transport parameter. A client (e.g., a WTRU) may set an HCC IE in one or more transport parameters sent in a QUIC packet (e.g., an initial QUIC packet) to a server (e.g., a proxy). A server may decide to accept the compression methods and parameters proposed and/or a subset of the compression methods and parameters. The server may send back the agreed compression methods and parameters in one or more QUIC transport parameters in response to the client. After sending/receiving the response, the endpoints may be set up and may start using IHC for one or more (e.g., all) traffics on the connection.

Per-DCCP/QUIC connection IHC may be configured using the per-service flow configuration of QUIC IHC. QUIC may support multiplexing, and it may be possible for a client (e.g., a WTRU) to include, e.g., for a UDP service flow, an HCC IE in a MASQUE CONNECT request sent to a server (e.g., a proxy). For example, the HCC IE may be encoded as an HTTP header. The server may decide to accept the methods and parameters proposed or a subset of the proposed methods and parameters. The server may send back the agreed methods and parameters in an HTTP header in a response, e.g., the 200 OK response, to the client. After sending/receiving the response, the endpoints may be set up and may start using IHC for one or more (e.g., all) traffics on the connection. An example of encoding may follow, where values for the ROHC profiles are profile identifiers provided in RFC5795 and/or identifiers of profiles described herein. header-compression: method="rohc", profiles=(0x0002 0x0003)

Per-DCCP/QUIC connection IHC may be configured using DCCP connection-wide configuration of inner header compression. A header compression configuration IE may be added as a DCCP option in a DCCP request/response message. The header compression configuration IE may be sent in a request message, such as a DCCP request message. In examples, a WTRU may send a header compression configuration IE in a DCCP request message to a proxy. In examples, a proxy may send a header compression configuration IE in a DCCP request message to a WTRU. The header compression configuration IE may request using inner header compression. A response message, such as a DCCP response message, may be sent back to signal an agreement to use the inner header compression. Upon receiving the option (e.g., agreeing to use the inner header compression) in a request, a DCCP endpoint may decide to accept the methods and parameters proposed or a subset of the proposed methods and parameters. The DCCP endpoint may send back the agreed methods and parameters in a response. After sending/receiving a response, the endpoints may be set up and may start using header compression for inner packets for one or more (e.g., all) traffics on the connection.

Per-DCCP/QUIC connection IHC may be configured using per-service flow configuration of a DCCP inner header compression. Multiplexing support may be added to DCCP. For example, multiplexing support may be added to DCCP by adding a header including a flow ID. The flow ID may be included in the header as an extension. A MASQUE CONNECT request over DCCP, e.g., in association with a flow ID, may be implemented. The request may be sent on a DCCP packet, e.g., including a flow ID. The proxy may implement a MASQUE service on one or more packets using the flow ID (e.g., same flow ID). A client (e.g., a WTRU) may include a header compression configuration IE in a request (e.g., a MASQUE CONNECT request) sent over DCCP to the server (e.g., a proxy). For example, a client, such as a WTRU, may include a header compression configuration IE in a MASQUE connect request sent over DCCP to a server, such as a proxy, for a UDP, IP, and/or Ethernet service flow. Header compression with QUIC MASQUE described herein may apply to DCCP.

Header compression may be set up and may be processed within one or more DCCP/QUIC connections. If a DCCP/QUIC connection is configured with an HCC IE, a DCCP/QUIC connection may set up compressor and/or decompressor instances, e.g., for ROHC and/or EHC. The DCCP/QUIC connection may set up a traffic classification algorithm. The traffic classification algorithm may classify traffic into a stream(s), e.g., to improve the efficiency of compression (e.g., a ROHC compression). One or more packet filters associated with ATSSS rules and/or QoS flow rules may be used as an input to the classification algorithm. For example, one or more packet filters associated with the ATSSS rules and/or the QoS flow rules may be configured into the DCCP/QUIC connection, e.g., using a programmatic API by the WTRU/UPF. Header compression (e.g., ROHC profiles as described herein and/or EHC on inner Ethernet headers) may be applied, by the DCCP/QUIC connection, on one or more packets. In examples, header compression may be applied prior to path selection. In examples, header compression may be applied after the path selection. ROHC profiles may include one or more profiles (e.g., one or more existing profiles), such as RTP/UDP/IP, UDP/IP, IP. The ROHC profiles may include one or more profiles, such as RTP, as described herein. Header compression may be applied. For example, header compression may be applied prior to encrypting the DCCP/QUIC packet.

Header compression may be set up and may be processed within an MA-PDU session tunnel between a client and a server. IHC may be implemented in an MA-PDU tunnel client on a WTRU and an MA-PDU tunnel server on a UPF (e.g., in addition to and/or as an alternative to IHC by the DCCP/QUIC connections as described herein). Header compression setup and processing by a tunnel client/server may be similar to header compression processing by DCCP/QUIC connection as described herein. IHC by a tunnel client/server may be applied prior to sending one or more outbound packets to a DCCP/QUIC connection and after receiving one or more inbound packets from a DCCP/QUIC connection. IHC may be implemented in an MA-PDU tunnel client on the WTRU and the MA-PDU tunnel server on the UPF and IHC by the DCCP/QUIC connections may be referred to as IHC by DCCP/QUIC layer.

In examples, an application packet, such as [PAYLOAD:RTP:UDP:IP], may be transported over a DCCP-based MA-PDU session. The DCCP connection may compress the inner headers and may emit the packet, such as [PAYLOAD:ROHC(RTP:UDP:IP):DCCP:IP]. ROHC(x) may represent a ROHC header carrying compressed data for header(s).

In examples, an application packet may be transported over a QUIC-based MA-PDU session. The QUIC connection may compress one or more inner headers and may emit the packet, such as [PAYLOAD:ROHC(RTP:UDP:IP):QUIC:UDP:IP].

In examples, an application packet may be transported over a QUIC-based MA-PDU session, e.g., using MASQUE. The QUIC connection may compress one or more inner headers and may emit the packet, such as [PAYLOAD:ROHC(RTP):QUIC:UDP:IP].

In examples, an application packet may be transported over a DCCP-based MA-PDU session, e.g., using a DCCP MASQUE as described herein. The DCCP connection may compress one or more inner headers and may emit the packet, such as [PAYLOAD:ROHC(RTP):DCCP:IP].

Figure 5:
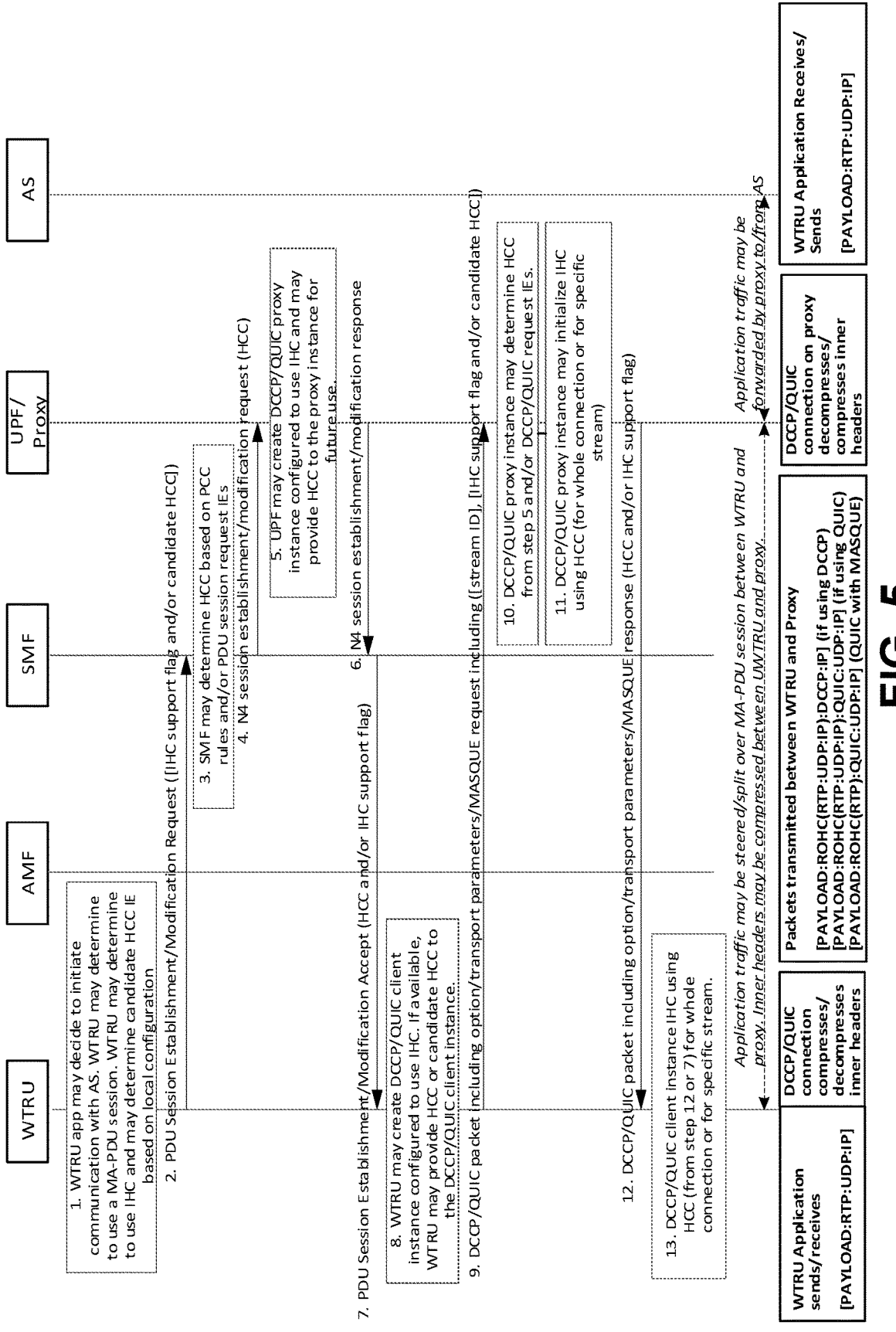
FIG. 5 illustrates exemplary access-independent IHC for DCCP/QUIC MA-PDU sessions.

FIG. 5 illustrates exemplary access-independent IHC for DCCP/QUIC MA-PDU sessions. As shown in FIG. 5, a header compression configuration may be exchanged between a WTRU and a network, e.g., using NAS and/or data plane signaling. One or more processes illustrated in FIG. 5 may or may not be performed (e.g., skipped).

As shown in FIG. 5, a WTRU and/or a WTRU application associated with a WTRU may decide to initiate communication with an AS layer. The WTRU may determine to use an MA-PDU session. The WTRU may determine to use IHC and may determine candidate HCC IE, e.g., based on a local configuration and/or a local policy.

As illustrated in FIG. 5, a WTRU may send a request to a network node. As described herein a network node may provide an SMF. For example, a WTRU may send a PDU session establishment request and/or a PDU session modification request to a network node (e.g., an SMF associated with a network node). The request may be or may include an IHC support flag. For example, an IHC support flag may indicate and/or may be configured to indicate that the WTRU wishes to use an IHC over a PDU session. The request may be or may include a candidate HCC IE, if the IE was determined. A candidate HCC described herein may be or may include one or more candidate HCCs. For example, a candidate HCC described herein may be or may include one or more candidate HCCs that the WTRU wishes to use an IHC over a PDU session. In examples, the HCC described herein may indicate one or more compression methods.

As illustrated in FIG. 5, the network node and/or the SMF associated with the network node may determine to use a DCCP/QUIC based MA-PDU session. For example, the SMF may use a DCCP/QUIC based MA-PDU session based on a configuration and/or a PCC rule(s). The SMF may determine the HCC IE. For example, the SMF may determine the HCC IE, such as the supported HCC IE, based on a policy rule(s) (e.g., PCC rules) and/or PDU session request IEs (e.g., if provided by the WTRU, such as an IHC support flag and/or a candidate HCC IE).

In examples, the network node and/or the SMF associated with the network node may determine the HCC IE based on one or more UPF capabilities. For example, the SMF may determine the HCC IE based on one or more UPF capabilities using one or more compression methods and/or compression profiles that are configured to be supported by a network node and/or a UPF associated with a network node. For example, the network node/SMF may have an HCC from a policy, from the one or more UPF capabilities, and/or from a candidate HCC provided by a WTRU. For example, an HCC from a policy and/or an HCC from a candidate HCC may be referred to as an input HCC. In examples, if more than one input HCC is available from a policy, a UPF capability, and/or a candidate HCC, the network node/SMF may determine an HCC IE based on combining the input HCC. For example, the SMF may determine an HCC IE based on combining the input HCC by selecting a subset of compression methods and/or compression profiles present in one or more (e.g., all) input HCCs. In examples, if an IHC support flag is present (e.g., as illustrated in FIG. 5), a value from the IHC support flag may be used in the combination described herein. For example, if the IHC support flag is false, the value from the IHC support flag may be used and/or configured to indicate an HCC without a compression method.

One or more policy rules may be or may include an HCC IE, e.g., including one or more compression types and/or one or more supported compression profiles. The HCC IE may associate a policy rule with one or more compression types/profiles. A policy rule may associate HCC IE with one or more service data flows (SDF).

As illustrated in FIG. 5, the network node and/or the SMF may send a request (e.g., a connection request message) to a network node and/or a UPF. For example, a first network node and/or an SMF associated with the first network node may send an N4 session establishment/modification request to a second network node and/or a UPF associated with the second network node. The request (e.g., the N4 session establishment/modification request) may be or may include an HCC IE. As described herein, the HCC may indicate one or more compression methods. For example, the HCC may indicate one or more compression methods supported by a proxy. Upon reception, based on the request, the network node (e.g., the second network node) and/or the UPF associated with the second network node may configure packet detection and/or enforcement and reporting rule(s). The network node (e.g., the second network node) and/or the UPF associated with the second network node may create a DCCP/QUIC proxy instance configured for using the IHC. A proxy may be configured to use an HCC (e.g., the HCC from the WTRU). In examples, a network associated with an AS may configure a proxy to use an HCC (e.g., the HCC from the WTRU).

In examples, a network node and/or an AS associated with a network node may configure a proxy to use an HCC. For example, an AS may configure a proxy to use an HCC using a user plane protocol over a connection between an AS and a proxy.

In examples, a network node and/or an AS associated with a network node, e.g., acting as an application function (AF), may configure an HCC. For example, an AS may configure an HCC, e.g., associated with a traffic flow filter and/or with a subscriber or a WTRU ID, in a network exposure function (NEF) or a policy control function (PCF), using an API exposed by NEF/PCF. In examples, an NEF or a PCF may store the HCC in a PCC if an HCC is associated with a traffic flow filter. For example, if an NEF or a PCF stores the HCC in a PCC, a network node and/or a UPF associated with a network node may retrieve the HCC from an N4 message from another network node and/or an SMF associated with a network node, as described herein. In examples, an NEF or a PCF may store an HCC in a unified data management (UDM) if an HCC is associated with a subscriber ID or a WTRU ID. For example, if an NEF or a PCF stores the HCC in a UDM, a network node and/or a UPF associated with a network node may retrieve the HCC from the UDM and/or an SMF may retrieve the HCC from the UDM and provide the HCC to the SMF in an N4 message.

In examples, as illustrated in FIG. 5, the network node and/or the UPF may configure a proxy to use an HCC (e.g., the HCC from the WTRU). The network node and/or the UPF may provide the HCC IE to DCCP/QUIC proxy instance for use. The network node and/or the UPF may provide related IEs, e.g., traffic filters for SDF associated with HCC IE. The network node and/or the UPF may send a response to the network node and/or the SMF. In examples, the second network node and/or the UPF may send an N4 session establishment/modification response message to the first network node and/or the SMF. In examples, the second network node and/or the UPF may send a connection response message to the first network node and/or the SMF. In examples, the connection response message may include and/or indicate an address for the configured proxy described herein. In examples, the connection request message may include and/or indicate a tunneling protocol as described herein. For example, the network node/UPF may establish a connection (e.g., a connection between a WTRU and another network node/SMF) using the tunneling protocol.

As illustrated in FIG. 5, the network node and/or the SMF may send a message to the WTRU, through the network node and/or the AMF (e.g., AMF signaling). For example, a first network node and/or the SMF may send a PDU session establishment/modification accept message to the WTRU using a second network node and/or the AMF (e.g., using the AMF signaling). The PDU session establishment/modification accept message may be or may include an HCC IE. In examples, the HCC IE may be provided (e.g., by the UPF/proxy) and may not be present in the accept message (e.g., the PDU session establishment/modification accept message). A flag, such as an IHC support flag, may be in the accept message (e.g., the PDU session establishment/modification accept message). The IHC support flag may indicate to the WTRU that the IHC is supported by the network on the PDU session.

As illustrated in FIG. 5, the WTRU may create a DCCP/QUIC client instance configured to use IHC. If an HCC and/or a candidate HCC is available, the WTRU may configure a DCCP/QUIC client instance using the HCC and/or the candidate HCC.

As illustrated in FIG. 5, the WTRU (e.g., DCCP/QUIC connection) may send a message to the configured proxy and/or the network node/UPF. In examples, the WTRU may send a DCCP/QUIC message to the configured proxy. In examples, the WTRU may send a DCCP/QUIC message to the network node and/or UPF. The DCCP/QUIC message may be or may include an IHC support flag and/or a candidate HCC. The DCCP/QUIC message may be or may include one or more of the following: a DCCP packet including an option type IHC and/or including the HCC IE; a QUIC initial packet including transport parameters and/or including a transport parameter holding the HCC IE; a MASQUE request sent over QUIC; and/or a MASQUE request sent in a DCCP message.

In examples, a DCCP/QUIC message may be or may include a DCCP packet including an option type IHC and/or including the HCC IE.

In examples, a DCCP/QUIC message may be or may include a QUIC packet. For example, the QUIC packet may be a QUIC initial packet. The QUIC packet may be or may include one or more transport parameters and/or a transport parameter holding the HCC IE.

In examples, a DCCP/QUIC message may be or may include a MASQUE request sent over QUIC (e.g., HTTP/3 CONNECT request). The MASQUE request may be sent over a stream identified with a QUIC stream ID. The MASQUE service configured by the request, including IHC, may be apply to one or more packets associated with the stream ID. In examples, the IHC may be configured on a per-stream basis. In examples, the HCC IE may be encoded. For example, the HCC IE may be encoded using HTTP headers, such as supported-header-compression-methods (e.g., holding a list of supported header-compression methods such as ROHC, EHC, etc.) and/or supported-rohc-profiles (e.g., holding a list of supported ROHC profiles).

In examples, a DCCP/QUIC message may be or may include a MASQUE request sent in a DCCP message (e.g., using an HTTP CONNECT request, using an equivalent COAP request, or using a DCCP option). The HCC IE may be encoded. For example, the HCC IE may be encoded using HTTP headers supported-header-compression-methods and/or supported-rohc-profiles as described herein. The IHC determined for the request may apply to the connection and/or to a flow ID. For example, if a DCCP flow ID, as described herein, is associated with the MASQUE request, the IHC determined for the request may apply to a flow ID.

As illustrated in FIG. 5, the DCCP/QUIC proxy instance may determine the HCC IE to apply to the connection or the stream, from the network node and/or the UPF creating DCCP/QUIC proxy instance and/or DCCP/QUIC request IEs. In examples, a proxy may receive a request message. For example, the proxy may receive a request message from the WTRU. The request message may indicate an HCC. For example, the HCC may indicate one or more compression methods supported by the WTRU.

As described herein and as illustrated in FIG. 5, the network node and/or the UPF may determine a supported HCC. In examples, the network node and/or the UPF may determine a supported HCC using a first HCC (e.g., the candidate HCC from the connection request message from the WTRU using the network node and/or the SPF) and a second HCC (e.g., the candidate HCC from the request message from the WTRU and received by the proxy as described herein).

In examples, the supported HCC may indicate a compression method(s) supported by the proxy and the WTRU. For example, as described herein, the network node and/or the UPF may determine a supported compression method using the one or more compression methods supported by the proxy (e.g., based on the first HCC as described herein) and the one or more compression methods supported by the WTRU (e.g., based on the second HCC as described herein). The network node and/or the UPF may determine the supported HCC based on the supported compression method.

In examples, the supported HCC may indicate a compression method(s) and a compression profile supported by the proxy and the WTRU. For example, as described herein, the network node and/or the UPF may determine a supported compression profile using the one or more compression profiles supported by the proxy (e.g., based on the first HCC as described herein) and the one or more compression profiles supported by the WTRU (e.g., based on the second HCC as described herein). The network node and/or the UPF may determine the supported HCC based on the supported compression profile and/or the compression method.

As illustrated in FIG. 5, the network node and/or the UPF may have an HCC IE obtained from another network node and/or the SMF. In examples, the HCC IE obtained from the SMF may represent the HCC that is supported by a system (e.g., a 5G system). In examples, the HCC IE obtained from the SMF may represent the HCC that is supported by the another network and/or the UPF. In examples, the HCC IE obtained from the SMF may represent the HCC that was requested by an application provider (e.g., via one or more PCC rules).

As illustrated in FIG. 5, the network node and/or the UPF may have a candidate HCC IE obtained from the WTRU. The obtained candidate HCC IE may represent the HCC that the WTRU is willing to use on the connection. For example, one or more WTRUs may implement different header compression methods and/or compression profiles. In examples, a WTRU may indicate one or more header compression methods and/or compression profiles that the WTRU supports in the candidate HCC. The network node and/or the UPF may determine the combined HCC. For example, the UPF may determine the combined HCC by selecting a subset of compression methods and/or compression profiles covered by an HCC (e.g., from an SMF) and a candidate HCC. In examples, a WTRU may select one or more compression methods and/or compression profiles based on a protocol payload (e.g., an expected protocol payload). The WTRU may send a candidate HCC including the selected one or more compression methods and/or compression profiles. If the WTRU sends a candidate HCC including the selected one or more compression methods and/or compression profiles, the network node and/or the UPF may determine a combined HCC by selecting a subset of compression methods and/or compression profiles covered by an HCC (e.g., from a network node and/or an SMF associated with a network node) and a candidate HCC.

As illustrated in FIG. 5, the DCCP/QUIC proxy instance may initialize IHC for the connection or the stream, e.g., using HCC IE.

As illustrated in FIG. 5, the DCCP/QUIC proxy may send a response message. For example, the DCCP/QUIC proxy may send a DCCP/QUIC response message. The DCCP/QUIC response message may be or may include an option/transport parameters/MASQUE response and/or may be or may include the HCC IE used for initializing the proxy. The HCC IE may be encoded as described herein. In addition to and/or alternatively, the HCC IE may be provided in a PDU session establishment/modification accept message as described herein (e.g., if not present in a DCCP/QUIC response message). An IHC support flag may be present in the response message (e.g., a DCCP/QUIC response message). The IHC support flag may indicate to the WTRU that IHC is supported by the proxy on the connection or the stream. In examples, as illustrated in FIG. 5, the network node and/or the UPF may establish a connection. For example, the first network node/UPF may establish a connection between the second network node/SMF and the WTRU, as described herein.

As illustrated in FIG. 5, the DCCP/QUIC client instance, using HCC IE, may initialize header compression on the connection or the stream, e.g., using the HCC IE from a DCCP/QUIC response message or a PDU session establishment/modification accept message. In examples, the network node/UDF may receive a data message (e.g., a first data message). The data message may be or may include a compressed header and a data payload. The network node/UDF may determine a header. For example, the network node/UDF may determine a header by decompressing the compressed header using the supported HCC as described herein. The network node/UDF may determine a network node. For example, the network node/UDF may determine a network node using the header. The network node/UDF may send a data message (e.g., a second data message) to the determined network node. For example, the data message may be or may include the header and the data payload.

In examples, the network node/UDF may receive a data message (e.g., a first data message) from a network node. For example, the data message may be or may include a header and a data payload. The network node/UDF may determine a compressed header. For example, the network node/UDF may determine a compressed header by compressing the header using the supported HCC. The network node/UDF may send a data message (e.g., a second data message) to the WTRU. For example, the data message may be or may include the compressed header and the data payload.

As illustrated in FIG. 5, a network node (e.g., a first network node) and/or an SMF associated with a network node (e.g., a first network node) and another network node (e.g., a second network node) and/or a UPF associated with a network node (e.g., a second network node) may be configured with a prioritized list of compression methods and/or compression profiles. For example, if the SMF and/or the UPF determine the HCC IE to use for a connection and determine that at least one (e.g., more than one) compression method and/or compression profile are available, the SMF and/or the UPF may use the prioritized list and select the compression method and/or the compression profile (e.g., with the highest priority). In examples, as illustrated in FIG.

5, the WTRU may provide a prioritized list of compression methods and/or compression profiles that the WTRU supports. For example, the WTRU may provide a prioritized list of compression methods and/or compression profiles that the WTRU supports in a candidate HCC IE. If the UPF determines the HCC IE to use for a connection and the UPF has a choice of at least one (e.g., more than one) compression method and/or compression profile available, the UPF may use a prioritized list and select the compression method and/or compression profile (e.g., with the highest priority).

The application traffic may be switched/steered/split over an MA-PDU session between the WTRU and the proxy (e.g., after the header compression has been initialized), as illustrated in FIG. 5. Inner headers may be compressed between the WTRU and the proxy, e.g., as described herein. The application traffic may be forwarded by the proxy to/from the AS.

Internet client and/or a server may establish IHC over a DCCP/QUIC connection. Network nodes, such as SMF and/or UPF may be skipped (e.g., may not be involved). For example, SMF/UPF functions associated with corresponding network nodes as described herein (e.g., 1 and 8-13 shown in FIG. 5) may be skipped. The DCCP/QUIC client may negotiate HCC with a server. For example, the DCCP/QUIC client may provide a candidate HCC in a request (e.g., using a message as described in a DCCP/QUIC message). The server may provide an accepted HCC in a response. The IHC may be configured on the client and the server, e.g., for the flows associated with the request.

Figure 6:
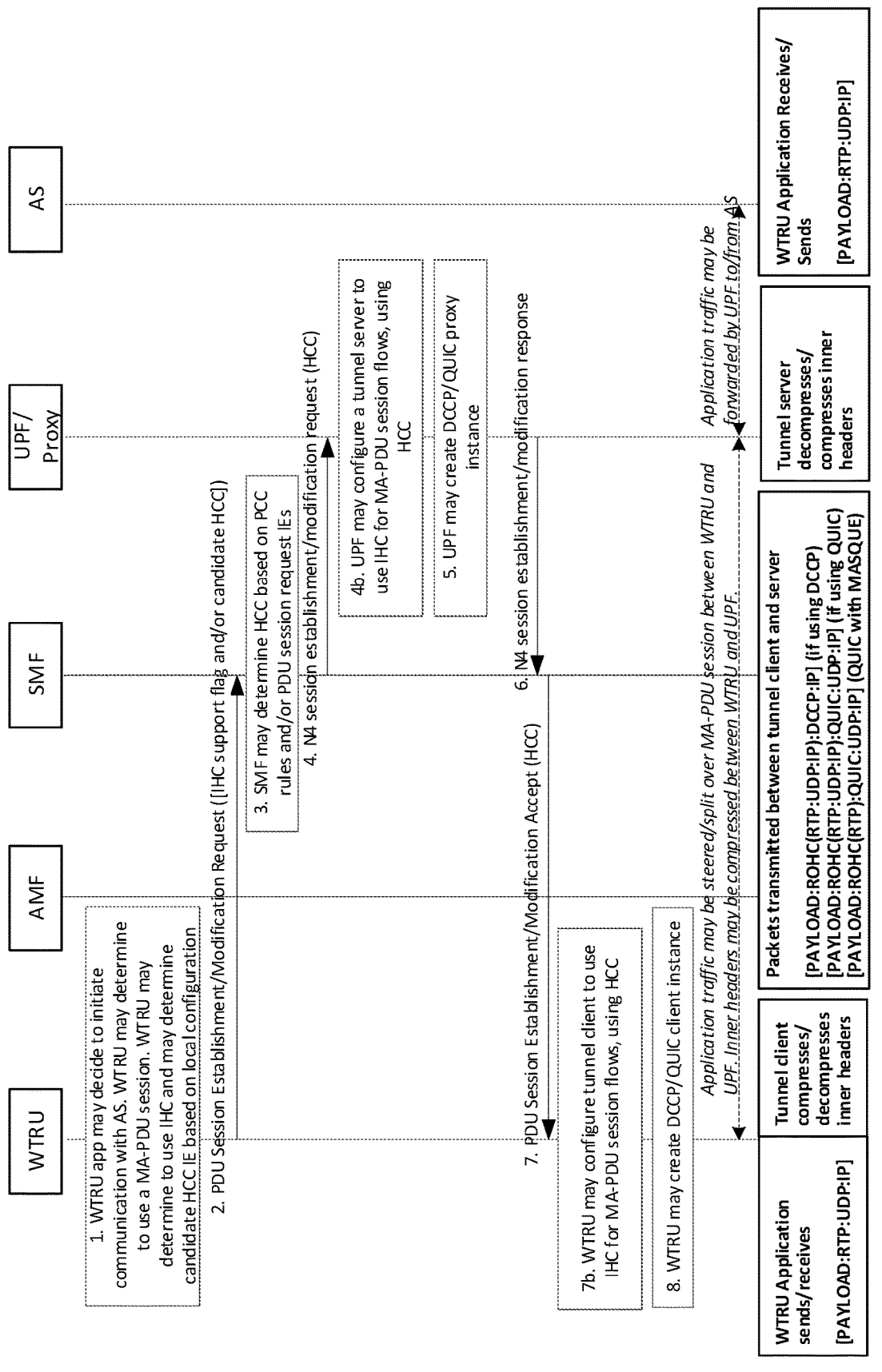
FIG. 6 illustrates exemplary access-independent IHC for DCCP/QUIC MA-PDU sessions.

FIG. 6 illustrates an example where an IHC operation is performed by a tunnel client on a WTRU and a server, e.g., on a UPF. For example, FIG. 6 may provide exemplary access-independent IHC for DCCP/QUIC MA-PDU sessions. One or more processes illustrated in FIG. 6 may or may not be performed (e.g., skipped).

As illustrated in FIG. 6, a WTRU, such as a WTRU application, may initiate (e.g., decide to initiate) a communication with a network node and/or AS associated with a network node. For example, a WTRU may determine to use an MA-PDU session. The WTRU may determine to use IHC. The WTRU may determine a candidate HCC IE, e.g., based on a local configuration and/or a policy.

The WTRU may send a request. For example, the WTRU may send a PDU session establishment request and/or a modification request. The request may be or may include a flag. For example, a flag, e.g., that is included in the request, may be or may include an IHC support flag. The flag may indicate that the WTRU wishes to use an IHC over a PDU session. The request may be or may include a candidate HCC IE if the IE was determined.

A network node and/or an SMF associated with the network node may determine to use a DCCP/QUIC based MA-PDU session, e.g., based on a configuration(s), a PCC rule(s), and/or based on a PDU session request IEs (e.g., if an IHC support flag/candidate HCC IE is provided as described herein). The SMF may determine the IHC configuration (e.g., HCC IE). For example, the network node/the SMF may determine the IHC configuration based on a PCC rule(s). The IHC configuration (e.g., HCC IE) in the PCC rule(s) may be or may include information about a compression type(s) and/or a supported compression profile(s) corresponding to one or more service data flows (SDFs).

The network node and/or the SMF may send a request to another network node and/or a UPF associated with the another network node. For example, a first network node and/or the SMF may send an N4 session establishment/ modification request to a second network node and/or the UPF. The N4 session establishment/modification request may be or may include an IHC configuration, such as an HCC IE.

The network node and/or the UPF may configure packet detection and/or enforcement and reporting rule(s). The network node and/or the UPF may configure a tunnel server to use the IHC, e.g., for an MA-PDU session flow(s). The network node and/or the UPF may create a DCCP/QUIC proxy instance(s). For example, the network node and/or the UPF may create a DCCP/QUIC proxy instance(s) to handle an MA-PDU session.

The network node and/or the UPF may send a response to another network node and/or the SMF. For example, a first network node and/or the UPF may send an N4 session establishment/modification response to a second network node and/or the SMF.

The network node and/or the SMF may send a message to the WTRU. For example, the network node and/or the SMF may send a message to the WTRU through another network and/or the AMF (e.g., using AMF signaling. In examples, the message may be or may include a PDU session establishment/modification accept message. In examples, the message may be or may include an IHC configuration (e.g., HCC IE).

The WTRU may configure a tunnel client. For example, the WTRU may configure a tunnel client to use the IHC for the MA-PDU session flow(s). For example, the WTRU may configure the tunnel client to use the IHC for the MA-PDU session flow based on the IHC configuration (e.g., HCC IE) from a message (e.g., PDU session establishment/modification accept message). The WTRU may create a DCCP/QUIC instance(s). For example, the WTRU may create a DCCP/QUIC instance(s) to handle the MA-PDU session.

The application traffic may be switched/steered/split over an MA-PDU session between the WTRU and the network node and/or the UPF. For example, the application traffic may be switched/steered/split over an MA-PDU session between the WTRU and the network node and/or the UPF after the DCCP/QUIC proxy instance(s) has been created. One or more inner headers may be compressed between the WTRU and the proxy. The application traffic may be forwarded by the proxy to/from the network node and/or the AS.

A PDCP-based inner header may be compressed. For example, one or more PDCP-based inner headers may be compressed for a DCCP/QUIC MA-PDU session(s).

On an access, such as a 3GPP access, an IHC for a DCCP/QUIC MA-PDU session(s) may be supported, e.g., at a PDCP layer. A PDCP layer IHC may rely on the PDCP layer to compress one or more headers inside a DCCP/QUIC payload. For example, QUIC may use null encryption. In examples, a ROHC compression may be applied to one or more inner headers (e.g., independently from the compression of one or more outer headers). In examples, a ROHC compression may be applied per-packet on outer and inner headers. For example, a ROHC compression may be applied once per-packet on outer and inner headers. The PDCP layer may be configured using a configuration (e.g., an existing configuration) with one or more ROHC compression profiles on a per data radio bearer (DRB) basis. The one or more ROHC compression profiles on a per DRB basis described herein may correspond to one or more QoS flows. One or more different profiles may be configured for one or more different QoS flows and/or for one or more different DCCP/QUIC connections. QUIC may coalesce one or more QUIC packets in a UDP datagram. In examples, the QUIC may coalesce one or more QUIC packets in a UDP datagram, and the PDCP-based inner header compression on such packets may compress the first inner headers. In examples, the QUIC may coalesce one or more packets at the beginning of a connection.

In examples, a PDCP compression may be applied to one or more outer headers and/or one or more inner headers. For example, a PDCP compression may be applied a first time on one or more outer headers and a second time on one or more inner headers. To process traffic, a PDCP layer may apply one or more ROHC compressions. For example, a PDCP layer may apply a first ROHC compression on one or more outer headers and apply a second ROHC compression on a payload of one or more inner headers. The MA-PDU transport protocol (e.g., QUIC or DCCP) may be included in a ROHC profile (e.g., the first or second ROHC profile). If a QUIC-based MA-PDU session is used, QUIC may use one or more frames to encapsulate one or more inner packets. A ROHC compression may be applied to payload of datagram frames. For example, the second application of the ROHC compression described herein may be applied to the payload of the datagram frames. To enable the ROHC compression (e.g., second application of the ROHC compression), the PDCP layer may parse the QUIC packet and apply the compression (e.g., the second compression) to an applicable frame payload, e.g., payload of DATAGRAM frames.

In examples, an RTP packet sent over an MA-PDU session based on DCCP PAYLOAD:RTP:UDP:IP:DCCP:IP may be compressed by a PDCP layer as PAYLOAD:ROHC (RTP:UDP:IP):ROHC(DCCP:IP). ROHC(x) may represent a ROHC header carrying compressed data for header(s).

In examples, a packet PAYLOAD:RTP:UDP:IP:QUIC: UDP:IP may be compressed by a PDCP layer as PAYLOAD: ROHC(RTP:UDP:IP):frame:ROHC(QUIC:UDP:IP). As discussed herein, a frame (e.g., a DATAGRAM frame) may be included in a QUIC packet. The frame label may represent a QUIC frame header. For example, as described herein, the QUIC frame header may not be compressed and/or additionally/alternatively may be handled by ROHC compression. In examples, a QUIC packet including more than one (e.g., two) DATAGRAM frames may be compressed by PDCP, e.g., as PAYLOAD2:ROHC(RTP:UDP:IP):frame2: PAYLOAD1:ROHC(RTP:UDP:IP):frame1:ROHC(QUIC: UDP:IP).

In examples, a boundary (e.g., a different boundary) between the two applications of ROHC may be used. For example, ROHC(RTP:UDP:IP:DCCP):ROHC(IP) boundary may be used (e.g., instead of ROHC(RTP:UDP:IP):ROHC (DCCP:IP)).

In examples where a PDCP compression is applied to one or more outer headers first and to one or more inner headers second, as described here, a WTRU may configure the PDCP compression for the one or more inner headers, e.g., using a secondaryHeaderCompression IE in the PDCP-Config-NB IE. The PDCP-config-NB IE may be used to set configurable PDCP parameters for data radio bearers, as illustrated in FIG. 7. For example, FIG. 7 illustrates an exemplary PDCP configuration for the double application of ROHC. PDCP-Config-NB IE may be seen as an encoding of HCC IE and may be used to provide HCC to the PDCP layer. If the HCC IE is present, the PDCP layer may set up a secondary header compression, e.g., to be applied to the payload following the headers compressed in the first application of ROHC on the packet. One or more existing profiles may be present in headerCompression and secondaryHeaderCompression (e.g., profile 0x0002 is for compressing UDP/IP, etc., for example, as provided by RFC 5795). One or more profiles, such as QUIC/UDP/IP or DCCP/IP, etc., may be added to the headerCompression and/or secondaryHeaderCompression configuration IE. Applying a secondary ROHC compression may be skipped. Different DRBs may be configured with and without secondaryHeaderCompression. For example, DRBs for DCCP/QUIC based MA-PDU sessions may be distinct from DRBs for other PDU sessions. In examples, for an RTP packet sent over an MA-PDU session based on DCCP, the first application of ROHC may be for ROHC profile QUIC/UDP/IP (e.g., outer headers), and the secondary header compression may be for ROHC profile RTP/UDP/IP (e.g., inner headers). In examples, for a packet compressed by PDCP, the first application of ROHC may be for profile UDP/IP, and the secondary application of ROHC may be for profile RTP/UPD/IP/QUIC.

In examples, a PDCP compression may be applied to outer and inner headers (e.g., one time). For example, if a PDCP compression may be applied (e.g., applied once) on outer and inner headers, the PDCP layer may be configured. For example, the PDCP layer may be configured as usual using the headerCompression IE of the PDCP-Config-NB IE. One or more ROHC profiles may be used to enable an inner header compression. For example, one or more ROHC profiles may be used to enable an inner header compression using a template INNER/TRANSPORT/OUTER as described herein. A PDCP layer may operate a header compression. For example, a PDCP layer may operate a header compression, as usual, using the ROHC profiles described herein.

In examples, a packet, such as PAYLOAD:RTP:UDP:IP: DCCP:IP, may be compressed by a PDCP layer. For example, a packet PAYLOAD:RTP:UDP:IP:DCCP:IP may be compressed by a PDCP layer as PAYLOAD:ROHC(RTP: UDP:IP:DCCP:IP) between a WTRU and a RAN.

In examples, a packet, such as PAYLOAD:RTP:UDP:IP: QUIC:UDP:IP, may be compressed by a PDCP layer. For example, a packet PAYLOAD:RTP:UDP:IP:QUIC:UDP:IP may be compressed by a PDCP layer as PAYLOAD:ROHC (RTP:UDP:IP:QUIC:UDP:IP) between a WTRU and a f RAN. A QUIC packet may be or may include one or more frames. The PDCP compression applied to the one or more outer headers and inner headers (e.g., once as described herein) may be applied to a frame (e.g., the first frame) of a QUIC packet.

Ethernet header compression may be supported. For example, a PDCP header compression may be used for ROHC and EHC, e.g., in the case where an Ethernet header is present. The inner Ethernet header may be carried in the inner packet (e.g., as shown in FIGS. 3A-3C). EHC and ROHC may be combined. For example, ROHC may be applied to the outer header, EHC on the inner Ethernet header, and/or ROHC may be applied to inner IP and other inner headers. The inner Ethernet header may be temporarily removed while over the MA-PDU session. For example, the inner Ethernet header may be temporarily removed (e.g., while over the MA-PDU session) from the inner packet and may be inserted below the outer IP packet. EHC may be applied (e.g., applied first) on the Ethernet header, and ROHC is applied. For example, if PDCP compression is applied to the outer and inner headers, the ROHC may be applied once. In an example, if the PDCP compression is applied to outer headers and then to inner headers, the ROHC may be applied more than once (e.g., twice).

Figure 8:
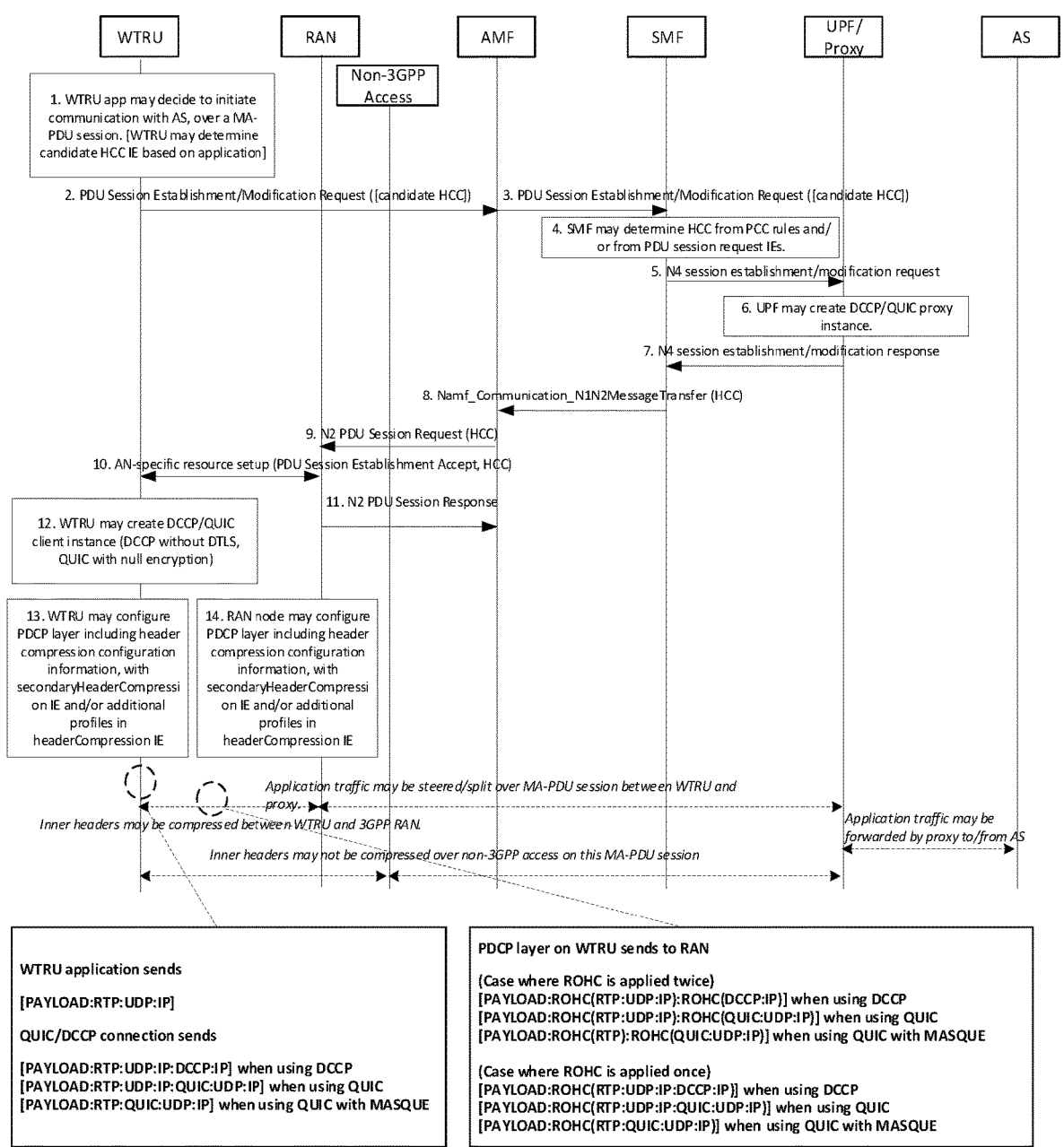
FIG. 8 illustrates exemplary PDCP-based inner header compression for DCCP/QUIC MA-PDU sessions.

FIG. 8 illustrates exemplary PDCP-based inner header compression for one or more DCCP/QUIC MA-PDU sessions. As described herein, FIG. 8 illustrates an example configuration of a PDCP layer using inner header compression information. One or more processes illustrated in FIG. 8 may or may not be performed (e.g., skipped).

As illustrated in FIG. 8, a WTRU may register with a network, such as a mobile network. As described herein, a WTRU may send a message to a network including one or more HCCs. The one or more HCCs may include one or more of compression types, supported compression profiles, and/or QoS flow IDs identifying flows for which such compression applies.

As illustrated in FIG. 8, a WTRU and/or an application associated with a WTRU may decide to initiate a communication with a network node and/or an AS associated with a network node. For example, a WTRU may initiate a communication with a network node/AS over an MA-PDU session. The WTRU may determine a candidate HCC IE. For example, the WTRU may determine (e.g., locally determine) a candidate HCC IE using application ID to look up one or more URSP rules. The one or more URSP rules may be or may include an HCC IE and/or a local configuration.

As illustrated in FIG. 8, the WTRU may send a request to a network mode and/or an SMF associated with a network node. For example, the WTRU may send a PDU session establishment/modification request to a network node/an SMF through another network node and/or an AMF associated with the network node (e.g., using AMF signaling). In examples, the WTRU may include a candidate HCC IE in the request.

As illustrated in FIG. 8, the network node/the SMF may determine an HCC from one or more PCC rules and/or from one or more PDU session request IEs (e.g., candidate HCC if provided). The one or more PCC rules may include an HCC IE that associates a PCC rule with specific compression types/profiles. For example, an HCC IE may be or may include one or more compression types and/or one or more supported compression profiles.

As illustrated in FIG. 8, the network node/the SMF may send a request to a network node and/or a UPF associated with a network node. For example, the network node/the SMF may send an N4 session establishment/modification request to a network node and/or a UPF. Based on the message, the network node/the UPF may create a DCCP/QUIC proxy instance and may send back a response message to another network node/the SMF. For example, a first network node/the UPF may send an N4 session establishment/modification response to a second network node/the SMF. The response message may be or may include including proxy information, such as the DCCP/QUIC port used by the proxy instance.

As illustrated in FIG. 8, the network node/the SMF may send a message, such as a PDU session establishment accept message (e.g., including HCC IE) towards the WTRU. For example, the network node/the SMF may send a PDU session establishment accept message (e.g., including HCC IE) to the WTRU over a message, e.g., a Namf_Communication_N1N2MessageTransfer message, to the network node/the AMF. The HCC IE in may be encoded as a PDCP configuration for a double application of ROHC and/or PDCP configuration for an application of ROHC (e.g., a simple application of ROHC). The PDCP configuration may set one or more compression methods and/or one or more profiles. For example, the PDCP configuration may set one or more appropriate compression methods and/or one or more appropriate profiles based on the HCC IE determined by the network node/the SMF.

As illustrated in FIG. 8, the network node/the AMF may forward a message, e.g., an accept message, over a message, e.g., an N2 PDU Session request message, to a network node, such as the RAN and/or a gNodeB node. As illustrated in FIG. 8, the network node/the RAN node may forward a message, e.g., the accept message, towards the WTRU, e.g., over AN specific signaling exchange with the WTRU. The network node/the RAN node may send back a response message, e.g., an N2 PDU session response message, to another network node/the AMF, as illustrated in FIG. 8.

As illustrated in FIG. 8, the WTRU may create a DCCP/QUIC client instance. The WTRU may configure a PDCP layer, including header compression configuration information as per the HCC IE received from the network node/the SMF, e.g., with secondaryHeaderCompression IE and/or additional profiles in headerCompression IE.

As illustrated in FIG. 8, the network node/the RAN node may configure a PDCP layer, including header compression configuration information as per the HCC IE received from the SMF, e.g., with secondaryHeaderCompression IE and/or additional profiles in headerCompression IE.

As illustrated in FIG. 8, an MA-PDU session may be set up between the WTRU and the network node/UPF. For example, an MA-PDU session may be set up between the WTRU and the network node/UPF, enabling communication between a client application and the network node/the AS. One or more application traffics may be switched/steered/split over multiple paths/access technologies between the WTRU and a proxy. One or more application traffic may be forwarded by the proxy to/from a network node/an AS associated with a network node. One or more inner headers may be compressed on an access path (e.g., a 3GPP access path) between the WTRU and a network node/a RAN, as described herein.

One or more outer headers may be removed. In examples, one or more outer headers may be removed in one or more point-to-point DCCP/QUIC/MPTCP MA-PDU sessions. In examples, one or more outer headers (e.g., IP or UDP/IP) may be removed in one or more DCCP/QUIC/MPTCP-based MA-PDU sessions, e.g., using a point-to-point mode.

An MA-PDU session for point-to-point mode operation may be configured. A WTRU and/or a network/an SMF may signal a message indicating that an MA-PDU session supports point-to-point mode. For example, the WTRU and/or the network node/the SMF may signal that a point-to-point MA-PDU optimization IE in a message, such as a PDU session establishment request/accept message. Within an MA-PDU session, if a QoS flow is being created, a network node, such as an SMF associated with a network node, may associate a QoS flow (e.g., identified by QFI) with a point-to-point connection tuple IE (e.g., 5-tuple: WTRU IP address and port, remote endpoint/proxy IP address and port, protocol, and/or the like). The association may be configured in the WTRU and in a network node and/or a UPF associated with a network node (e.g., by another network node, such as an SMF associated with another network node).

An MA-PDU session may be configured to operate for a point-to-point mode operation. A WTRU and a network node, such as a UPF associated with a network node, may send one or more packets, e.g., on a point-to-point QoS flow, without one or more outer headers IP (e.g., with DCCP) or UDP/IP (e.g., with QUIC). For example, a DCCP/QUIC layer (e.g., associated with a WTRU) may send/receive data as one or more DCCP packets and/or one or more QUIC packets over a socket (e.g., a raw socket). The DCCP/QUIC layer may forward packets to/from a layer, such as a lower layer, e.g., service data adaption protocol (SDAP) layer. The network node/the UPF may be configured to add/remove one or more UDP/IP headers to packets decapsulated/encapsulated from/to GTP-U, for QoS flows of the MA-PDU.

The QoS for the MA-PDU may be associated with a point-to-point mode. The network node/the UPF may use QFI, point-to-point connection tuple IE, and/or the like. For example, the network node/the UPF may use QFI, point-to-point connection tuple IE, and/or the like to identify traffic that may need to be processed in the manner described herein. The QUIC/DCCP connection on the network node/the UPF may listen on the UDP port configured on the network node/the UPF.

Figure 9:
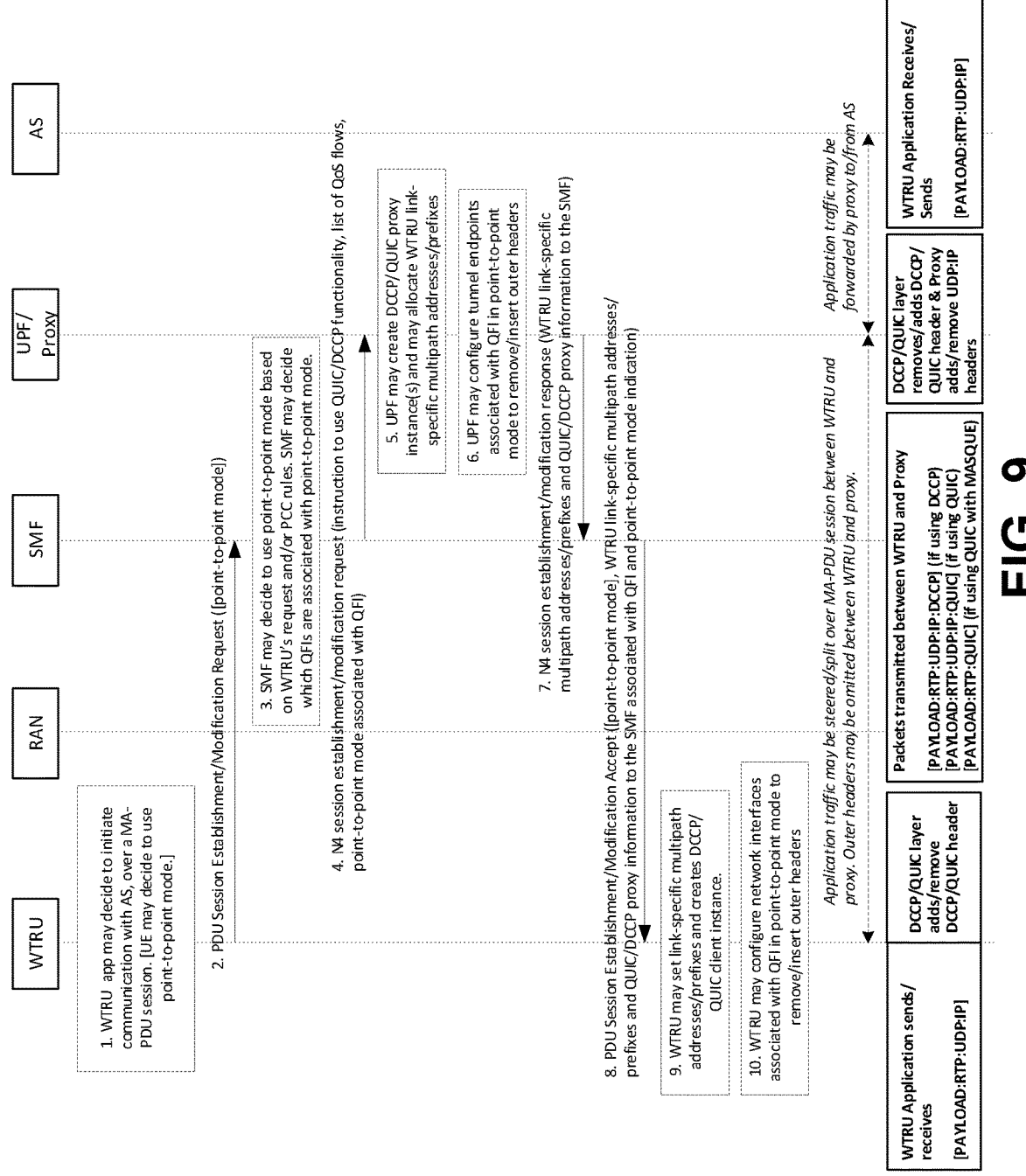
FIG. 9 illustrates exemplary OHR in point-to-point DCCP/QUIC/multipath transmission control protocol (MPTCP) MA-PDU sessions.

FIG. 9 illustrates exemplary OHR in one or more point-to-point DCCP/QUIC/MPTCP MA-PDU sessions. For example, FIG. 9 illustrates removing an outer header(s) between a WTRU and a network node (e.g., a UPF associated with a network node) and/or a proxy. One or more processes illustrated in FIG. 9 may or may not be performed (e.g., skipped).

As illustrated in FIG. 9, a WTRU and/or a WTRU application associated with a WTRU may decide to initiate a communication with a network node and/or an AS associated with a network node. For example, a WTRU may initiate a communication with a network node/an AS over an MA-PDU session. In examples, the WTRU may decide to use a point-to-point mode. In examples, a network node, such as an AS associated with the network node, may send an indication to the WTRU to use a point-to-point mode.

As illustrated in FIG. 9, the WTRU may send a request to a network node and/or an SMF associated with a network node through another network node/the AMF. For example, the WTRU may send a request to a first network node/the SMF through a second network node/the AMF. The request may be a PDU session establishment/modification request. If the WTRU decides to use a point-to-point mode and/or be configured to use a point-to-point mode, the WTRU may include a point-to-point mode IE (e.g., a flag) in the request.

As illustrated in FIG. 9, the network node/the SMF may determine to set up an MA-PDU session based on a configuration. For example, the network node/the SMF may determine to set up an MA-PDU session based on a DCCP/QUIC configuration. The network node/the SMF may select one or more service flows that should be carried over a point-to-point QoS flow. The selection may be based on one or more IEs from a request message and/or from one or more PCC rules. In addition to and/or alternatively, the network node/the SMF may select one or more (e.g., all) service flows to be carried over one or more point-to-point QoS flows. One or more PCC rules may include a point-to-point mode IE that may be set, e.g., to indicate that point-to-point mode should be used for a service flow. The network node/the SMF may determine which QFIs are associated with one or more point-to-point modes.

As illustrated in FIG. 9, the network node/the SMF may send a request to another network node/a UPF associated with another network node. For example, a first network node/the SMF may send an N4 session establishment/modification request to a second network node/the UPF. The request may be or may include an instruction to use DCCP/QUIC functionality, a list of QoS flows, and/or a point-to-point mode associated with a QFI.

As illustrated in FIG. 9, the network node/the UPF may create a DCCP/QUIC proxy instance(s) and may allocate one or more WTRU link-specific multipath addresses/prefixes. The network node/the UPF may configure one or more tunnel endpoints associated with QFI in point-to-point mode. For example, the network node/the UPF may configure one or more tunnel endpoints associated with QFI in point-to-point mode to remove/insert one or more outer headers.

As illustrated in FIG. 9, the network node/the UPF may send a response to another network node/the SMF. For example, a first network node/the UPF may send an N4 session establishment/modification response to a second network node/the SMF. The response may be or may include one or more WTRU link-specific multipath addresses/prefixes and/or DCCP/QUIC proxy information to the network node/the SMF.

As illustrated in FIG. 9, the network node/the SMF may send a message to the WTRU. For example, the network node/the SMF may send a PDU session establishment/modification accept message to the WTRU. The message may be or may include a point-to-point mode IE, e.g., to indicate that point-to-point mode is supported by the PDU session. The accept message may be or may include one or more WTRU link-specific multipath addresses/prefixes and/or DCCP/QUIC proxy information. In examples, the accept message may be or may include information associated with one or more QFIs. In examples, the accept message may be or may include a point-to-point mode indication IE. The point-to-point mode indication IE may indicate to the WTRU that the associated QFI is using a point-to-point mode. The association may be encoded. For example, the association may be encoded by placing the point-to-point mode indication IE (e.g., after the QFI), in the accept message.

As illustrated in FIG. 9, the WTRU may set one or more link-specific multipath addresses/prefixes. For example, the WTRU may create a DCCP/QUIC client instance(s), as illustrated in FIG. 9.

As illustrated in FIG. 9, the WTRU may configure the DCCP/QUIC client instance(s) associated with QFI in a point-to-point mode. For example, the WTRU may configure the DCCP/QUIC client instance(s) associated with QFI in a point-to-point mode to send one or more DCCP/QUIC packets without an outer header(s), e.g., as described herein.

As illustrated in FIG. 9, the application traffic may be switched/steered/split over the MA-PDU session between the WTRU and a proxy. The outer headers may be omitted between the WTRU and a proxy. The application traffic may be forwarded by a proxy to/from the network node/the AS.

In examples, a point-to-point connection tuple IE associated with a QFI may indicate the point-to-point nature of an MA-PDU session (e.g., in addition to and/or instead of using a point-to-point MA-PDU optimization IE as described herein). In examples, one or more point-to-point connection tuples may be associated with a QFI by adding an index (e.g., an integer) that corresponds to a point-to-point connection tuple IE. The index may be carried in a packet. For example, the index may be carried in a packet to enable a WTRU and/or a network node/a UPF associated with a network node to set the corresponding outer headers. For example, the index may be encoded in a QUIC connection ID.

In examples, one or more OHR methods described herein may enable ROHC to be applied to a point-to-point connection. For example, the one or more OHR methods described herein may enable ROHC to be applied to both sides of the point-to-point connection on a DCCP header. In a DCCP connection on an endpoint (e.g., a WTRU and a network node/a UPF associated with a network node), ROHC may be applied. In examples, in a DCCP connection on an endpoint (e.g., a WTRU and a network node/a UPF associated with a network node), ROHC may be applied prior to sending a DCCP packet to a remote endpoint (e.g., using a socket send function call). In examples, ROHC may be applied after reading a packet received from the remote endpoint (e.g., using a socket receive function call).

One or more ROHC profiles may be provided (e.g., defined). For compression at a PDCP layer, if a ROHC context is used, one or more ROHC profiles may be provided (e.g., defined) to compress one or more headers. For example, one or more ROHC profiles may be provided (e.g., defined) to one or more compressed headers following a template INNER/TRANSPORT/OUTER. INNER, TRANSPORT, and/or OUTER components may be described herein.

For compression at a PDCP layer, if a second ROHC context is used, one or more ROHC profiles may follow a template INNER and TRANSPORT/OUTER.

For compression of an inner traffic by a DCCP/QUIC connection, one or more ROHC profiles may follow a template INNER.

INNER, TRANSPORT, and/or OUTER components may be provided (e.g., defined). INNER component may be a set of inner protocols being carried in a DCCP and/or a QUIC-based MA-PDU session. For example, the INNER component may exist in one or more ROHC profiles, such as RTP/UDP/IP, UDP/IP, IP, or ROHC profiles such as an RTP (e.g., useful to handle RTP inner traffic if UDP/IP header is omitted due to using MASQUE). If no known/compressible inner header is identified, none may be used.

TRANSPORT component may be a protocol used to carry an MA-PDU session traffic, such as DCCP (e.g., including multipath extension) or QUIC (e.g., including multipath extension).

OUTER component may be a set of outer protocols that carries a transport protocol, e.g., UDP/IP for QUIC transport, IP for DCCP transport, and/or no protocol if a point-to-point MA-PDU mode is used.

For the one or more ROHC profiles described herein, a protocol header may be handled. For example, the ROCH profiles may be handled as provided by a standard, such as RFC 5225. The DCCP protocol header handling may be provided, for example, based on a standard such as one provided by the Internet Engineering Task Force (IETF). The QUIC protocol header may be handled if one or more (e.g., all) fields are considered IRREGULAR, e.g., uncompressible, as provided in RFC 5225. QUIC protocol may be provided (e.g., defined), e.g., in cases where the connection ID length is known a priori, in short headers the connection ID field may be handled as a STATIC, e.g., constant throughout the lifetime of the flow.

QUIC protocol may be compressed. Long header form may be used for packets, such as initial-, handshake- and O-RTT-type packets, which are used at the beginning of a connection and/or by a limited number of packets. Potential compression gain from redundancy may be limited. Short header form may be used by 1-RTT data packets. Short header form may be or may include an octet followed by a connection identifier (CID). QUIC compression of short header may be useful if a long CID is used. For example, one or more WTRU-proxy QUIC connections of an MA-PDU session may be configured to use short CIDs (e.g., 1 or 2 bytes) or even a zero-length CID. QUIC header compression may be skipped for the short CIDs or the zero-length CID.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A first network node, the first network node comprising:
a processor, wherein the processor is configured to:
    receive a connection request message from a second network node, wherein the connection request message indicates a request to establish a connection between the first network node and a wireless transmit/receive unit (WTRU) and indicates a first header compression configuration (HCC);
    configure a proxy to use the first HCC;
    receive, via the proxy, a request message from the WTRU, wherein the request message indicates a second HCC;
    determine a supported HCC using the first HCC and the second HCC, wherein the supported HCC indicates a compression method supported by the proxy and the WTRU;
    configure the proxy to use the supported HCC; and
    send a response message to the WTRU, wherein the response message indicates the supported HCC.

2. The first network node of claim 1, wherein the first HCC indicates one or more compression methods supported by the proxy.

3. The first network node of claim 2, wherein the second HCC indicates one or more compression methods supported by the WTRU, and wherein the processor is further configured to determine the supported HCC using the first HCC and the second HCC by:
    determining a supported compression method using the one or more compression methods supported by the proxy and the one or more compression methods supported by the WTRU; and
    determining the supported HCC based on the supported compression method.

4. The first network node of claim 1, wherein the first HCC indicates a compression method and one or more compression profiles supported by the proxy, wherein the second HCC indicates a compression method and one or more compression profiles supported by the WTRU, and wherein the processor is further configured to determine the supported HCC using the first HCC and the second HCC by:
    determining a supported compression profile using the one or more compression profiles supported by the proxy and the one or more compression profiles supported by the WTRU; and
    determining the supported HCC based on the supported compression profile and the compression method.

5. The first network node of claim 1, wherein the processor is further configured to send a connection response message to the second network node, wherein the connection response message indicates an address for the proxy, and wherein the request message further indicates the address.

6. The first network node of claim 1, wherein the processor is further configured to establish the connection between the first network node and the WTRU.

7. The first network node of claim 6, wherein the connection request message further indicates a tunneling protocol, wherein the processor is configured to establish the connection using the tunneling protocol.

8. The first network node of claim 1, wherein the processor is further configured to:

receive a first data message, wherein the first data message comprises a compressed header and a data payload;

determine a header by decompressing the compressed header using the supported HCC;

determine a third network node using the header; and send a second data message to the third network node, wherein the second data message comprises the header and the data payload.

9. The first network node of claim 1, wherein the processor is further configured to:

receive a first data message from a third network node, wherein the first data message comprises a header and a data payload;

determine a compressed header by compressing the header using the supported HCC; and send a second data message to the WTRU, wherein the second data message comprises the compressed header and the data payload.

10. The first network node of claim 1, wherein the first network node provides a user plane function, and wherein the second network node provides a session management function.

11. A method performed by a first network node, the method comprising:

receiving a connection request message from a second network node, wherein the connection request message indicates a request to establish a connection between the first network node and a wireless transmit/receive unit (WTRU) and indicates a first header compression configuration (HCC);

configuring a proxy to use the first header compression configuration;

receiving, via the proxy, a request message from the WTRU, wherein the request message indicates a second HCC;

determining a supported HCC using the first HCC and the second HCC, wherein the supported HCC indicates a compression method supported by the proxy and the WTRU;

configuring the proxy to use the supported HCC; and sending a response message to the WTRU, wherein the response message indicates the supported HCC.

12. The method of claim 11, wherein the first HCC indicates one or more compression methods supported by the proxy.

13. The method of claim 12, wherein the second HCC indicates one or more compression methods supported by the WTRU, and wherein the method further comprises determining the supported HCC using the first HCC and the second HCC by:

determining a supported compression method using the one or more compression methods supported by the proxy and the one or more compression methods supported by the WTRU; and determining the supported HCC based on the supported compression method.

14. The method of claim 11, wherein the first HCC indicates a compression method and one or more compression profiles supported by the proxy, wherein the second HCC indicates a compression method and one or more compression profiles supported by the WTRU, and wherein the method further comprises determining the supported HCC using the first HCC and the second HCC by:

determining a supported compression profile using the one or more compression profiles supported by the proxy and the one or more compression profiles supported by the WTRU; and determining the supported HCC based on the supported compression profile and the compression method.

15. The method of claim 11, wherein the method further comprises sending a connection response message to the second network node, wherein the connection response message indicates an address for the proxy, and wherein the request message further indicates the address.

16. The method of claim 11, wherein the method further comprises establishing the connection between the first network node and the WTRU.

17. The method of claim 16, wherein the connection request message further indicates a tunneling protocol, wherein the method comprises establishing the connection using the tunneling protocol.

18. The method of claim 11, wherein the method further comprises:

receiving a first data message, wherein the first data message comprises a compressed header and a data payload;

determining a header by decompressing the compressed header using the supported HCC;

determining a third network node using the header; and sending a second data message to the third network node, wherein the second data message comprises the header and the data payload.

19. The method of claim 11, wherein the method further comprises:

receiving a first data message from a third network node, wherein the first data message comprises a header and a data payload;

determining a compressed header by compressing the header using the supported HCC; and sending a second data message to the WTRU, wherein the second data message comprises the compressed header and the data payload.

20. The method of claim 11, wherein the first network node provides a user plane function, and wherein the second network node provides a session management function.

* * * * *